US010956982B1

(12) United States Patent
Hayward et al.

(10) Patent No.: US 10,956,982 B1
(45) Date of Patent: Mar. 23, 2021

(54) SYSTEMS AND METHODS FOR ALLOCATING VEHICLE COSTS BETWEEN VEHICLE USERS FOR ANTICIPATED TRIPS

(71) Applicant: State Farm Mutual Automobile Insurance Company, Bloomington, IL (US)

(72) Inventors: Gregory Hayward, Bloomington, IL (US); Scott Christensen, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 514 days.

(21) Appl. No.: 15/587,041

(22) Filed: May 4, 2017

Related U.S. Application Data

(60) Provisional application No. 62/334,803, filed on May 11, 2016, provisional application No. 62/345,445, (Continued)

(51) Int. Cl.
*G06Q 40/08* (2012.01)
*G07C 5/00* (2006.01)
(Continued)

(52) U.S. Cl.
CPC ......... *G06Q 40/08* (2013.01); *G06Q 30/0283* (2013.01); *G07C 5/008* (2013.01); *G07C 5/02* (2013.01)

(58) Field of Classification Search
CPC .... G06Q 40/08; G06Q 30/0283; G06Q 30/02; G07C 5/00; G07C 5/008; G07C 5/02
See application file for complete search history.

(56) References Cited

U.S. PATENT DOCUMENTS 6,604,081 B1 5/2003 Manning et al.
7,225,154 B2 5/2007 Hansen
(Continued)

OTHER PUBLICATIONS

"Rebecca Copeland, Automotive Context-Aware Policy System for Car Connectivity Requests, 2015, Institute Telecom-Mines" (Year: 2015).*
(Continued)

*Primary Examiner* — Kenneth Bartley
*Assistant Examiner* — Gregory M James
(74) *Attorney, Agent, or Firm* — Armstrong Teasdale LLP

(57) ABSTRACT

Vehicle costs may be allocated between users of a vehicle, including autonomous vehicles. A vehicle cost allocation (VCA) computing device receives an anticipated trip report associated with an anticipated future trip, the anticipated trip report associated with at least one vehicle user including an anticipated driver of the vehicle and an anticipated passenger, the anticipated trip report including at least one of an anticipated destination and a distance of the anticipated future trip. The VCA computing device is also configured to determine one or more anticipated vehicle costs for the anticipated future trip. The vehicle costs may include usage-based or trip-based insurance. The VCA computing device is also configured to allocate a respective portion of the vehicle cost to the anticipated driver and passenger and transmit the anticipated vehicle costs to for review by the anticipated driver.

22 Claims, 11 Drawing Sheets

Related U.S. Application Data filed on Jun. 3, 2016, provisional application No. 62/418,611, filed on Nov. 7, 2016, provisional application No. 62/436,194, filed on Dec. 19, 2016, provisional application No. 62/438,193, filed on Dec. 22, 2016.

(51) Int. Cl.
*G07C 5/02* (2006.01)
*G06Q 30/02* (2012.01)

(56) References Cited

U.S. PATENT DOCUMENTS

| | | |
|---|---|---|
| 7,343,306 B1 | 3/2008 | Bates et al. |
| 7,725,390 B2 | 5/2010 | Plant |
| 8,244,549 B1 | 8/2012 | Stener |
| 8,515,772 B2 | 8/2013 | Hansen |
| 8,700,412 B2 | 4/2014 | Hansen |
| 9,082,072 B1 | 7/2015 | Wedding, Jr. |
| 9,141,112 B1 | 9/2015 | Loo et al. |
| 9,355,394 B2 | 5/2016 | Gupta |
| 9,373,201 B2 | 6/2016 | Jefferies et al. |
| 9,481,373 B2 | 11/2016 | Basir et al. |
| 9,586,591 B1 | 3/2017 | Fields |
| 9,830,665 B1 | 11/2017 | Healy et al. |
| 9,870,649 B1 | 1/2018 | Fields |
| 10,313,039 B2 | 6/2019 | Chung et al. |
| 10,319,039 B1 | 6/2019 | Konrardy |
| 10,388,085 B2 | 8/2019 | Harish et al. |
| 2003/0135423 A1 | 7/2003 | Daum |
| 2003/0139950 A1 | 7/2003 | Daum |
| 2006/0157563 A1 | 7/2006 | Marshall |
| 2006/0253339 A1* | 11/2006 | Singh ............... G06Q 30/00 705/26.41 |
| 2007/0106539 A1* | 5/2007 | Gay ................. G06Q 10/10 705/4 |
| 2007/0282638 A1* | 12/2007 | Surovy ............. G06Q 40/02 705/4 |
| 2008/0255888 A1 | 10/2008 | Berkobin et al. |
| 2009/0005963 A1* | 1/2009 | Jarvinen ........... G01C 21/3438 701/533 |
| 2009/0005974 A1* | 1/2009 | Lenneman ........ G01C 21/3469 701/533 |
| 2009/0094066 A1 | 4/2009 | Freudman |
| 2010/0131300 A1* | 5/2010 | Collopy ............ G06Q 30/0224 705/4 |
| 2011/0106668 A1 | 5/2011 | Korosec et al. |
| 2011/0246404 A1* | 10/2011 | Lehmann .......... G06Q 10/02 706/21 |
| 2012/0284105 A1* | 11/2012 | Li .................. G06Q 30/02 705/14.23 |
| 2012/0303392 A1 | 11/2012 | Depura |
| 2013/0006674 A1 | 1/2013 | Bowne |
| 2013/0046559 A1* | 2/2013 | Coleman ........... G06Q 10/10 705/4 |
| 2013/0169410 A1 | 7/2013 | Amselem |
| 2013/0185208 A1 | 7/2013 | Aaron et al. |
| 2014/0129053 A1 | 5/2014 | Kleve et al. |
| 2014/0278586 A1 | 9/2014 | Sanchez |
| 2014/0309804 A1 | 10/2014 | Ricci |
| 2014/0379385 A1* | 12/2014 | Duncan ............ G06Q 40/08 705/4 |
| 2015/0112731 A1* | 4/2015 | Binion ............. G06Q 40/08 705/4 |
| 2015/0149344 A1 | 5/2015 | Ananda Kumar et al. |
| 2015/0149350 A1 | 5/2015 | Ananda Kumar et al. |
| 2015/0154711 A1 | 6/2015 | Christopulos |
| 2015/0187019 A1 | 7/2015 | Fernandes et al. |
| 2015/0206206 A1 | 7/2015 | Puente et al. |
| 2015/0278942 A1 | 10/2015 | Krishnamurthy et al. |
| 2015/0278943 A1 | 10/2015 | Krishnamurthy et al. |
| 2015/0294422 A1 | 10/2015 | Carver |
| 2015/0302384 A1 | 10/2015 | Aadi et al. |
| 2015/0324928 A1* | 11/2015 | Collopy ............ G06Q 40/08 705/4 |
| 2015/0332518 A1 | 11/2015 | Menon |
| 2016/0071082 A1* | 3/2016 | Driscoll ........... G06Q 20/145 705/13 |
| 2016/0086285 A1* | 3/2016 | Jordan Peters .... G06Q 40/08 705/4 |
| 2016/0189304 A1* | 6/2016 | Todasco ........... G06Q 40/08 705/4 |
| 2016/0195404 A1* | 7/2016 | Prasad ............. G06Q 50/01 345/440 |
| 2016/0195406 A1 | 7/2016 | Miles |
| 2016/0196397 A1 | 7/2016 | Avganim |
| 2016/0371788 A1 | 12/2016 | Rackley, III et al. |
| 2017/0116696 A1* | 4/2017 | Moore ............. G06Q 50/30 |
| 2017/0124658 A1* | 5/2017 | Gordon ............ G06Q 40/08 |
| 2017/0144671 A1 | 5/2017 | Memani |
| 2018/0075538 A1 | 3/2018 | Konrardy |
| 2018/0300816 A1 | 10/2018 | Perl et al. |

OTHER PUBLICATIONS

Shaheen, et al., "Shared Mobility, A Sustainability & Technologies Workshop", Nov. 2015, pp. 1-30, available at http://innovativemobility.org/wp-content/uploads/2015/11/Shared Mobility_WhitePaper_FINAL.pdf (Year: 2015).

\* cited by examiner

SYSTEMS AND METHODS FOR ALLOCATING VEHICLE COSTS BETWEEN VEHICLE USERS FOR ANTICIPATED TRIPS

CROSS-REFERENCE TO RELATED APPLICATIONS

This application claims the benefit of priority to U.S. Provisional Patent Application No. 62/334,803, filed May 11, 2016, entitled "SYSTEMS AND METHODS FOR ALLOCATING VEHICLE COSTS BETWEEN VEHICLE USERS" and U.S. Provisional Patent Application No. 62/345,445, filed Jun. 3, 2016, entitled "SYSTEMS AND METHODS FOR ALLOCATING VEHICLE COSTS BETWEEN VEHICLE USERS", U.S. Provisional Patent Application No. 62/418,611, filed Nov. 7, 2016, entitled "SYSTEMS AND METHODS FOR ALLOCATING VEHICLE COSTS BETWEEN VEHICLE USERS", U.S. Provisional Patent Application No. 62/436,194, filed Dec. 19, 2016, entitled "SYSTEMS AND METHODS FOR ALLOCATING VEHICLE COSTS BETWEEN VEHICLE USERS," and U.S. Provisional Patent Application 62/438,193, filed Dec. 22, 2016, entitled "SYSTEMS AND METHODS FOR ALLOCATING VEHICLE COSTS BETWEEN VEHICLE USERS," the entire contents and disclosure of which are hereby incorporated herein in their entirety.

FIELD OF THE DISCLOSURE

The present disclosure generally relates to vehicle costs and, more particularly to systems and methods for dividing and allocating vehicle costs between users of a vehicle.

BACKGROUND

As car buyers become ever more finance and eco-conscious, vehicle manufacturers have responded by offering new buying options, including shared-ownership/shared-lease options. These options may offer car owners and lessors the opportunity to share responsibility and cost for the vehicle between multiple vehicle users, reducing the financial burden and the environmental impact of vehicle usage. However, these new options also present issues for these vehicle users in how they will split those vehicle costs—including insurance, fuel, and maintenance costs, among others—in the manner they find most equitable and fair. Even if these vehicle users can agree on one or more of these cost-sharing issues, even more problems arise when considering how to manage the actual allocation and subsequent payment of those costs.

BRIEF SUMMARY

The present embodiments may relate to systems and methods for dividing and allocating vehicle costs between multiple vehicle users of a vehicle. A shared vehicle system including a vehicle cost allocation (VCA) computing device may receive and process vehicle policies agreed-upon by all of the vehicle users. These vehicle policies may describe how one specific set of vehicle users chooses to divide and allocate any kind of vehicle costs. The VCA computing device may then track usage of the vehicle by each vehicle user and, according the usage and the vehicle policies, allocate a portion of a total operating cost of the vehicle to each vehicle user. In some embodiments, the VCA computing device may also manage payment of those vehicle costs on behalf of the vehicle users.

In one aspect, a vehicle cost allocation (VCA) computing device for allocating vehicle costs between users of a vehicle, such as an autonomous or semi-autonomous vehicle, may be provided. The VCA computing device may include a memory and a processor. The processor may be programmed to receive a potential trip report associated with a potential future trip to be performed using a vehicle. The potential trip report may be associated with at least one vehicle user including an anticipated driver of the vehicle and an anticipated passenger, and may include an anticipated destination. The processor may also be programmed to retrieve insurance policy information associated with at least one of the vehicles and the anticipated driver of the vehicle, and generate an anticipated insurance cost based upon the anticipated driver of the vehicle and the anticipated destination. The processor may be further programmed to allocate the anticipated insurance cost between the anticipated driver and the anticipated passenger, and transmit the anticipated insurance cost to one or more computing devices for review by the anticipated driver. The processor may be programmed to perform additional, fewer, or alternative actions, including those discussed elsewhere herein.

In another aspect, a computer-implemented method for allocating vehicle cost between users of a vehicle may be provided. The method may be implemented using a vehicle cost allocation (VCA) computing device including a processor in communication with a memory. The method may include receiving a potential trip report associated with a potential future trip to be performed using a vehicle. The potential trip report may be associated with at least one vehicle user including an anticipated driver of the vehicle and an anticipated passenger, and may include an anticipated destination. The method may also include retrieving insurance policy information associated with at least one of the vehicle and the anticipated driver of the vehicle, and generating an anticipated insurance cost based upon the anticipated driver of the vehicle and the anticipated destination. The method may further include allocating the anticipated insurance cost between the anticipated driver and the anticipated passenger, and transmitting the anticipated insurance cost to one or more computing devices for review by the anticipated driver. The method may include additional, fewer, or alternative actions, including those discussed elsewhere herein.

In a further aspect, a vehicle cost allocation (VCA) computing device for allocating vehicle costs between users of a vehicle may be provided. The VCA computing device may include a memory and a processor. The processor may be programmed to receive a trip report associated with a trip performed using a vehicle. The trip report may be associated with a plurality of vehicle users of the vehicle and may include an identification of a distance of the trip. The processor may also be programmed to determine which vehicle user of the plurality of vehicle users is a driver of the trip, and retrieve insurance policy information associated with the driver of the trip. The processor may be further programmed to calculate an insurance cost associated with the trip based at least in part upon the insurance policy information and the distance of the trip, and allocate the insurance cost between the plurality of vehicle users. The processor may be programmed to perform additional, fewer, or alternative actions, including those discussed elsewhere herein.

In yet another aspect, a computer-implemented method for allocating vehicle costs between users of a vehicle may be provided. The method may be implemented using a vehicle cost allocation (VCA) computing device including a processor and a memory. The method may include receiving a trip report associated with a trip performed using a vehicle. The trip report may be associated with a plurality of vehicle users of the vehicle, and may include an identification of a distance of the trip. The method may also include determining which vehicle user of the plurality of vehicle users is a driver of the trip, and retrieving insurance policy information associated with the driver of the trip. The method may further include calculating an insurance cost associated with the trip based at least in part upon the insurance policy information and the distance of the trip, and allocating the insurance cost between the plurality of vehicle users. The method may include additional, fewer, or alternative actions, including those discussed elsewhere herein.

In one aspect, a vehicle cost allocation (VCA) computing device for allocating vehicle costs between users of a vehicle may be provided. The VCA computing device may include a memory and a processor. The processor may be programmed to receive a plurality of trip reports associated with a corresponding plurality of trips performed using a vehicle within a predetermined interval of time. Each trip of the plurality of trips may be associated with one or more vehicle users of a plurality of vehicle users associated with the vehicle. The processor may also be programmed to generate a total vehicle usage report based at least in part upon the plurality of trip reports. The total vehicle usage report may describe the total usage of the vehicle by the plurality of vehicle users over the interval of time. The processor may be further programmed to determine a total vehicle cost associated with the vehicle over the interval of time based at least in part upon the total vehicle usage report, and generate a respective user usage report associated with each vehicle user of the plurality of vehicle users, based at least in part upon one or more trip reports of the plurality of trip reports associated with the corresponding vehicle user. The processor may also be programmed to determine a respective vehicle user cost attributable to each vehicle user of the plurality of vehicle users based at least in part upon the corresponding user usage report for the corresponding vehicle user and the total vehicle cost. The processor may be still further programmed to allocate each respective vehicle user cost to the corresponding vehicle user. The processor may be programmed to perform additional, fewer, or alternative actions, including those discussed elsewhere herein.

In another aspect, a computer-implemented method for allocating vehicle costs between users of a vehicle may be provided. The method may be implemented using a vehicle cost allocation (VCA) computing device including a processor and a memory. The method may include receiving a plurality of trip reports associated with a corresponding plurality of trips performed using a vehicle within a predetermined interval of time. Each trip of the plurality of trips may be associated with one or more vehicle users of a plurality of vehicle users associated with the vehicle. The method may also include generating a total vehicle usage report based at least in part upon the plurality of trip reports. The total vehicle usage report may describe the total usage of the vehicle by the plurality of vehicle users over the interval of time. The method may further include determining a total vehicle cost associated with the vehicle over the interval of time based at least in part upon the total vehicle usage report, and generating a respective user usage report associated with each vehicle user of the plurality of vehicle users, based at least in part upon one or more trip reports of the plurality of trip reports associated with the corresponding vehicle user. The method may also include determining a respective vehicle user cost attributable to each vehicle user of the plurality of vehicle users based at least in part upon the corresponding user usage report for the corresponding vehicle user and the total vehicle cost. The method may still further include allocating each respective vehicle user cost to the corresponding vehicle user. The method may include additional, fewer, or alternative actions, including those discussed elsewhere herein.

In yet another aspect, at least one non-transitory computer-readable storage media having computer-executable instructions embodied thereon may be provided. When executed by one or more processors, the computer-executable instructions may cause the one or more processors to receive a plurality of trip reports associated with a corresponding plurality of trips performed using a vehicle within a predetermined interval of time. Each trip of the plurality of trips may be associated with one or more vehicle users of a plurality of vehicle users associated with the vehicle. The computer-executable instructions may also cause the one or more processors to generate a total vehicle usage report based at least in part upon the plurality of trip reports. The total vehicle usage report may describe the total usage of the vehicle by the plurality of vehicle users over the interval of time. The computer-executable instructions may further cause the one or more processors to determine a total vehicle cost associated with the vehicle over the interval of time based at least in part upon the total vehicle usage report, and generate a respective user usage report associated with each vehicle user of the plurality of vehicle users, based at least in part upon one or more trip reports of the plurality of trip reports associated with the corresponding vehicle user. The computer-executable instructions may also cause the one or more processors to determine a respective vehicle user cost attributable to each vehicle user of the plurality of vehicle users based at least in part upon the corresponding user usage report for the corresponding vehicle user and the total vehicle cost. The computer-executable instructions may still further cause the one or more processors to allocate each respective vehicle user cost to the corresponding vehicle user. The computer-executable instructions may cause the one or more processors to perform additional, fewer, or alternative actions, including those discussed elsewhere herein.

In a further aspect, a vehicle cost allocation (VCA) computing device for allocating vehicle costs between users of a vehicle, the vehicle costs including an insurance cost, may be provided. The VCA computing device may include a memory and a processor. The processor may be programmed to receive a trip report associated with a trip performed using a vehicle, the trip associated with one or more vehicle users of a plurality of vehicle users of the vehicle. The processor may also be programmed to determine which vehicle user of the one or more vehicle users is a driver for the trip, and retrieve insurance policy information associated with the driver. The processor may be further programmed to retrieve one or more vehicle policies provided by the plurality of vehicle users, and determine an insurance cost associated with the trip based at least in part upon the insurance policy information and the one or more vehicle policies. The processor may be still further programmed to allocate the insurance cost between the one or more vehicle users. The processor may be programmed to perform additional, fewer, or alternative actions, including those discussed elsewhere herein.

In another aspect, a computer-implemented method for allocating vehicle costs between users of a vehicle, the vehicle costs including an insurance cost, may be provided. The method may be implemented using a vehicle cost allocation (VCA) computing device including a processor and a memory. The method may include receiving a trip report associated with a trip performed using a vehicle, the trip associated with one or more vehicle users of a plurality of vehicle users of the vehicle. The method may also include determining which vehicle user of the one or more vehicle users is a driver for the trip, and retrieving insurance policy information associated with the driver. The method may further include retrieving one or more vehicle policies provided by the plurality of vehicle users, and determining an insurance cost associated with the trip based at least in part upon the insurance policy information and the one or more vehicle policies. The method may still further include allocating the insurance cost between the one or more vehicle users. The method may include additional, fewer, or alternative actions, including those discussed elsewhere herein.

In one aspect, a vehicle cost allocation (VCA) computing device for managing payment of vehicle costs for users of a shared vehicle may be provided. The VCA computing device may include a memory and a processor. The processor may be programmed to determine a respective portion of a total vehicle cost to be allocated to each vehicle user of a plurality of vehicle users associated with a vehicle, the total vehicle cost associated the vehicle over a predetermined interval of time. The processor may also be programmed to access a respective pre-paid account associated with each vehicle user, and transmit instructions to a respective financial institution associated with each pre-paid account to withdraw funds corresponding to the respective portion of the total vehicle cost. The processor may be programmed to perform additional, fewer, or alternative actions, including those discussed elsewhere herein.

In a still further aspect, a computer-implemented method for managing payment of vehicle costs for users of a shared vehicle may be provided. The method may be implemented using a vehicle cost allocation (VCA) computing device including a processor and a memory. The method may include determining a respective portion of a total vehicle cost to be allocated to each vehicle user of a plurality of vehicle users associated with a vehicle, the total vehicle cost associated the vehicle over a predetermined interval of time. The method may also include accessing a respective pre-paid account associated with each vehicle user, and transmitting instructions to a respective financial institution associated with each pre-paid account to withdraw funds corresponding to the respective portion of the total vehicle cost. The method may include additional, fewer, or alternative actions, including those discussed elsewhere herein.

In one aspect of the present disclosure, a vehicle cost allocation (VCA) computing device for allocating vehicle costs between users of a vehicle may be provided. The VCA computing device may include a memory and a processor, wherein the processor is programmed to receive vehicle telematics data from one or more sensors within the vehicle, and, based upon the received vehicle telematics data, identify one or more vehicle users present in the vehicle during a trip. The processor may be further programmed to determine a vehicle cost associated with the trip, and allocate a respective portion of the vehicle cost to each of the one or more vehicle users. The processor may be programmed to perform additional, fewer, or alternative actions, including those discussed elsewhere herein.

In another aspect, a computer-implemented method for allocating vehicle costs between users of a vehicle may be provided. The method may be implemented using a vehicle cost allocation (VCA) computing device including a processor and a memory. The method may include receiving vehicle telematics data from one or more sensors within the vehicle, and based upon the received vehicle telematics data, identifying one or more vehicle users present in the vehicle during a trip. The method may also include determining a vehicle cost associated with the trip, and allocating a respective portion of the vehicle cost to each of the one or more vehicle users. The method may include additional, fewer, or alternative actions, including those discussed elsewhere herein.

In a further aspect, at least one non-transitory computer-readable storage media having computer-executable instructions embodied thereon may be provided. When executed by one or more processors, the computer-executable instructions may cause the one or more processors to receive vehicle telematics data from one or more sensors within the vehicle, and based upon the received vehicle telematics data, identify one or more vehicle users present in the vehicle during a trip. The computer-executable instructions may also cause the one or more processors to determine a vehicle cost associated with the trip, and allocate a respective portion of the vehicle cost to each of the one or more vehicle users. The computer-executable instructions may cause the one or more processors to perform additional, fewer, or alternative actions, including those discussed elsewhere herein.

In another aspect, a vehicle cost allocation (VCA) computing device for allocating vehicle costs between users of an autonomous vehicle may be provided. The VCA computing device may include a memory and a processor, wherein the processor is programmed to receive vehicle telematics data from one or more sensors within the autonomous vehicle, and, based upon the received vehicle telematics data, identify one or more vehicle users present in the autonomous vehicle during one or more trips performed using the autonomous vehicle. The processor may also be programmed to determine a vehicle cost associated with the one or more trips, and allocate a respective portion of the vehicle cost to each of the one or more vehicle users based upon their respective presence in the autonomous vehicle during the one or more trips. The processor may be programmed to perform additional, fewer, or alternative actions, including those discussed elsewhere herein.

In a still further aspect, a computer-implemented method for allocating vehicle costs between users of an autonomous vehicle may be provided. The method may be implemented using a vehicle cost allocation (VCA) computing device including a processor and a memory. The method may include receiving vehicle telematics data from one or more sensors within the autonomous vehicle, and, based upon the received vehicle telematics data, identifying one or more vehicle users present in the autonomous vehicle during one or more trips performed using the autonomous vehicle. The method may also include determining a vehicle cost associated with the one or more trips, and allocating a respective portion of the vehicle cost to each of the one or more vehicle users based upon their respective presence in the autonomous vehicle during the one or more trips. The method may include additional, fewer, or alternative actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
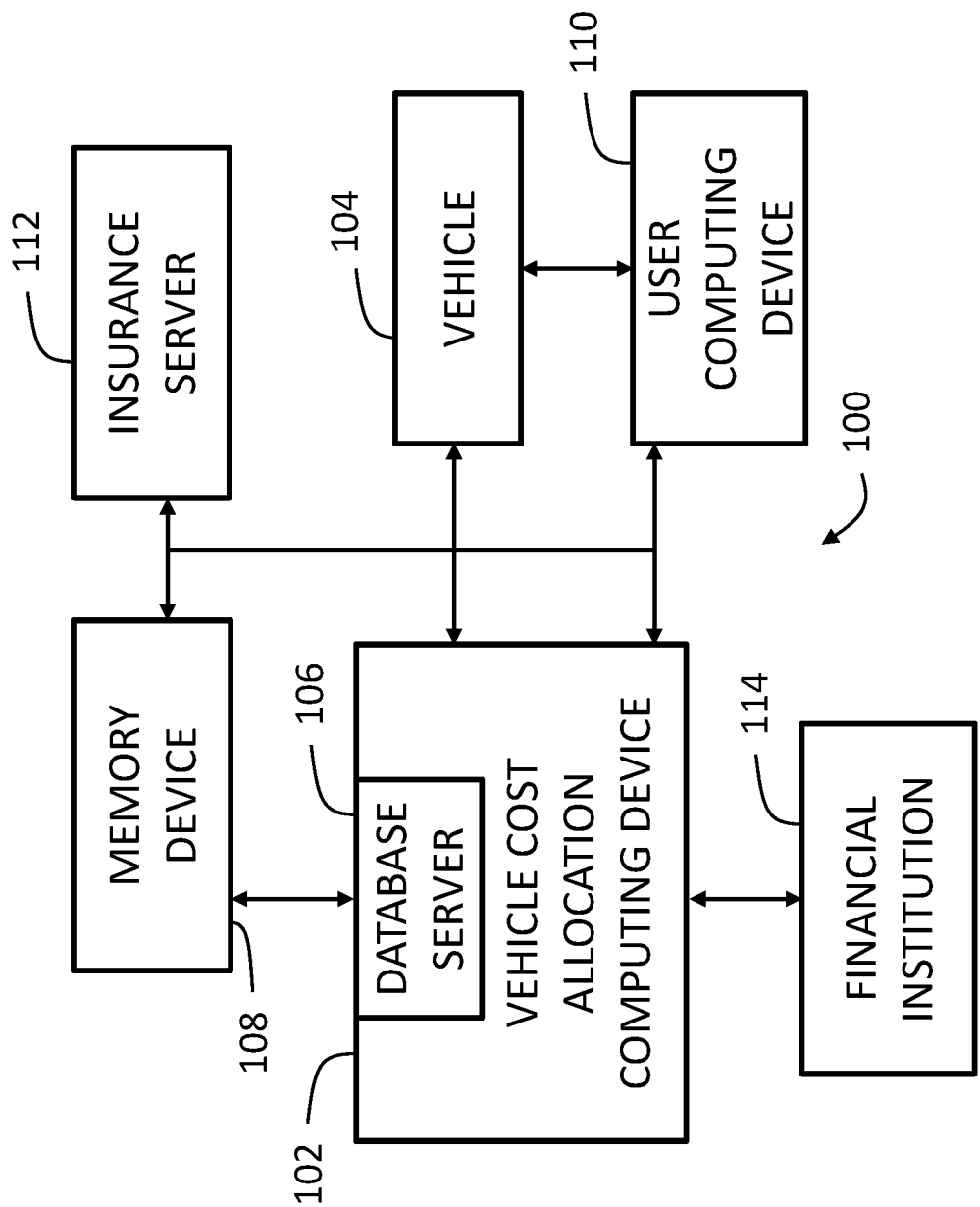
FIG. 1 illustrates a schematic diagram of an exemplary shared vehicle system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for dividing and allocating vehicle costs between users of a vehicle. More and more car-sharing programs are being created, in an effort to reduce transportation costs as well reduce environmental impact. Some car companies are going so far as to offer multiple-lessee car leases, or "co-leases." These projects may create situations in which cost-sharing plans and rules may be necessary, to avoid disputes and other similar problems among "co-owners" or other users of the vehicle.

The systems and methods described herein are directed to implementing a cost-sharing structure based upon a plurality of rules or policies agreed upon by all users of the vehicle. These "vehicle policies" may define who is responsible for particular portions of vehicle-related costs, such as insurance, fuel, maintenance, incidental, and/or other vehicle costs. For example, some costs may be split evenly between all vehicle users all of the time (e.g., a maintenance cost associated with an oil change). Other costs may be divided and allocated based upon individual and/or multi-user use (e.g., fuel costs divided based upon which user(s) is present on and/or responsible for each trip). Some costs may be divided and allocated based upon certain risk factors (e.g., insurance costs split based upon who is driving). Still other costs may be fully allocated to a single user (e.g., incidental costs such as toll costs may be only allocating to the commuting user using toll roads, or incidental costs such as a repair cost for an accident).

These vehicle policies may be automatically generated (e.g., by the system) and/or may be manually edited, updated, and/or requested by one or more vehicle users in a "setup" or "registration" phase. This registration phase may occur when one or more of the vehicle users retrieves the vehicle, for example, at a car dealership. In another embodiment, this registration phase may occur when the vehicle users choose to register with a vehicle cost allocation service. It should be understood that changes to an agreed-upon vehicle policy may be made with the approval of all vehicle users associated with the vehicle/the vehicle policy. In some embodiments, for some vehicle policies, such changes may further require approval of at least one other party, such as an insurance underwriter or a lessor.

In the exemplary embodiments, the vehicle cost allocation services may be provided and performed by a vehicle cost allocation (VCA) computing device. The VCA computing device may process the vehicle policies to determine how the vehicle users have agreed to divide and allocate costs associated with the vehicle. The VCA computing device may communicate with the vehicle and the vehicle users (e.g., using one or more computing devices associated with respective vehicle users) to track vehicle usage and vehicle costs. The VCA computing device may then divide vehicle costs in accordance with the agreed-upon vehicle policies, and allocate respective portions of the vehicle costs to the vehicle users. In some embodiments, the vehicle users may manage payment of the vehicle costs. In other embodiments, the VCA computing device may manage payments, for example, by transmitting withdrawal and transfer instructions to respective financial account(s) associated with the vehicle users.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, industrial vehicles (e.g., construction vehicles), "riding" lawnmowers, planes, and/or any kind of land-, water-, or air-based vehicle.

"Vehicle user," as used herein, may refer generally to a person who is responsible for the vehicle, and who has access to use of the vehicle. Vehicle users may include owners, lessors, and/or renters, for example, of a vehicle. Vehicle users may also refer generally to the users of the vehicle that have agreed to pay a portion of vehicle costs associated with the vehicle.

"Trip," as used herein, may refer generally to one complete use of the vehicle, from a starting point to an ending point. In some cases, the trip may commence when the vehicle is started and may terminate when the vehicle is turned off. If a trip is defined in this way, the vehicle may automatically track and record trips, as commencement and termination are simply defined. In other cases, the trip may be "manually" defined, such that a user designates a commencement and termination of a trip (e.g., when the vehicle may be turned on and off more than once in a single user of the vehicle). In such cases, the vehicle may prompt the user to designate the commencement and termination (e.g., using a user interface of the vehicle and/or using an app available on a user computing device) of the trip such that the vehicle may track and record the trip.

"App," as used herein, may refer generally to a software application installed and downloaded on a user interface of the vehicle and/or a user computing device associated with a vehicle user. An app associated with the shared vehicle system, as described herein, may be understood to be maintained by the shared vehicle system and/or one or more components thereof. Accordingly, the "maintaining party" of the app may be understood to be responsible for any functionality of the app and may be considered to instruct other parties/components to perform such functions via the app. In the exemplary embodiment, the app enables and/or requires the user computing device on which the app is installed and/or downloaded to pair with the vehicle (e.g., using a wireless connection, such as a Bluetooth® connection, or any other connection). "Pairing," as used herein, may refer generally to registering a connection between the vehicle and a user computing device such that the user computing device may be recognized by the vehicle as that particular user computing device, and/or such that the user computing device may communicate with the vehicle (e.g., to input information to the vehicle and/or receive information from the vehicle). "Dispute," as used herein, may refer generally to any challenge or disagreement with any portion of the vehicle costs that are allocated to a vehicle user.

Asset Costs

"Asset costs" may be associated with the actual vehicle itself, and how the vehicle users are permitted to use the vehicle. For example, asset costs may include lease costs, purchase costs (e.g., down payments and/or monthly payments), and/or rental costs. Asset costs may be determined according to a provider of the vehicle (e.g., a car dealership or rental provider). Asset costs may be divided and/or allocated to vehicle users, according to one or more agreed-upon vehicle policies.

In some embodiments, according to a particular vehicle policy, asset costs may be divided and allocated evenly between all vehicle users. In such cases, each vehicle user pays equally for the same access to, privilege of, and responsibilities for the vehicle. In other embodiments, accordingly to another vehicle policy, asset costs may be divided and allocated based upon actual usage of the vehicle by each vehicle user. As one example, each vehicle user may pay a percentage of the asset cost that is proportional to the amount they use the vehicle (e.g., in terms of time, mileage, etc.). As another example, each vehicle user may pay a portion of the asset cost according to their primary use type of the vehicle. In such cases, a vehicle user, User A, who uses the vehicle every week day, for commuting to and from work, may pay a higher portion of the asset cost than another vehicle user, User B, who uses the vehicle only on weekends for recreational purposes. Because User A is more reliant upon the vehicle, User A may agree to a vehicle policy in which they pay a higher portion of the asset cost.

Insurance Costs

"Insurance costs" may be associated with an insurance policy associated with use of the vehicle, and may be typically determined based upon a risk level associated with driver(s) of the vehicle. Insurance costs may be determined by an insurance provider of the insurance policy and divided and/or allocated to vehicle users, according to one or more agreed-upon vehicle policies associated with insurance costs.

In some embodiments, according to a particular vehicle policy, insurance costs may be divided and allocated evenly between all vehicle users. Insurance costs, in such cases, may be determined by the system based upon an average risk level attributable to all vehicle users collectively. In these embodiments, the vehicle user with the highest associated individual risk level may benefit unduly, as their share of the risk that contributes to the insurance cost is being shared between all vehicle users. Likewise, the vehicle user with the lowest associated individual risk level may be disadvantaged, as they may pay more of an insurance cost than they would if only their individual risk level were taken into account.

In other embodiments, according to other vehicle policies, different divisions and allocations of insurance costs are contemplated. In a first exemplary vehicle policy, each vehicle user may pay a percentage of the total insurance cost that is attributable to their respective share of the risk level. Take a set of three vehicle users, for instance. User A is a relatively low-risk driver and contributes only 20% of the total risk level for the set of vehicle users. User B is a moderate-risk driver and contributes 30% of the total risk level. User C is high-risk driver and contributes 50% of the total risk level. In this first example vehicle policy, regardless of any actual usage, User A pays 20% of the total insurance cost, User B pays 30% of the total insurance cost, and User C pays 50% of the total insurance cost. However, in such cases, User C may be disadvantaged if their actual usage of the vehicle is much less than that of User A and/or User B.

As a second exemplary vehicle policy, insurance costs may be split based upon actual usage, such as which vehicle user is driving the vehicle. Taking the same set of vehicle users described above, having a trip in which User A is driver may reduce the insurance cost associated with that trip. For such trips, the insurance costs associated with the trip may be divided and allocated evenly between all vehicle users present on the trip. For example, Users A, B, and C may each pay an equal portion of the insurance cost for the trip, wherein the insurance cost is calculated based upon User A acting as the driver. For such trips, the overall insurance cost divided and allocated between the set of vehicle users may be reduced, because of User A's comparatively low risk. User A may accordingly be a driver on comparatively more trips, to maintain a reduced insurance cost for the set of vehicle users. However, in such an example, Users B and C may benefit unduly at least in part because they are driving much less, and may be getting these low insurance costs for trips that they share (as passengers) with User A (as the driver). Accordingly, the set of vehicle users may agree upon a vehicle policy in which Users B and C may pay a slightly higher portion of other vehicle costs (e.g., fuel and/or maintenance costs) for each trip in which they are passengers while User A is driving.

Another exemplary vehicle policy may be directed to usage-based insurance costs determined either before and/or after a trip is taken. Usage-based insurance costs may be determined based upon characteristics of an insurance policy associated with the vehicle and/or with one or more vehicle users. For example, in some cases, an insurance policy may describe insurance costs incurred based upon a number of miles driven and/or an amount of time driven (e.g., based in part upon vehicle telematics data collected during a trip). In these cases, certain premiums may apply to mileage driven and/or time driven below a certain threshold, and other, greater premiums may apply to mileage driven and/or time driven above that threshold. In other cases, the same premium may apply to all mileage and/or time driven, for example, on a pay-by-mile basis. Individual insurance policies associated with the vehicle and/or with each vehicle user may be retrieved and processed to determine the insurance rate applied based upon a risk profile of the driver, as discussed above, and an insurance rate applied based upon the type and/or duration of a trip.

Fuel Costs

"Fuel costs" may be associated with fuel consumption by a vehicle and the corresponding refueling. "Fuel" may refer generally to any kind of fuel consumed by a vehicle, such as unleaded gas, diesel fuel, electricity, hydrogen, etc. Corresponding refueling costs may accordingly refer to gas/diesel prices, electric rates, fuel cells, etc. Fuel costs may be divided and/or allocated to vehicle users, according to one or more agreed-upon vehicle policies associated with fuel costs.

In one exemplary vehicle policy, fuel costs may be divided and allocated equally between each vehicle user. Such a vehicle policy may more likely be agreed upon by a set of vehicle users that typically use the vehicle at substantially equal rates. It will be understood that such a vehicle policy may be undesirable to a set of vehicle users in which one vehicle user consumes the most fuel (e.g., uses the vehicle the most and/or drives the furthest). Such a vehicle policy may additionally or alternatively be undesirable to a set of vehicle users in which one vehicle user consumes considerably less fuel than the one or more other vehicle users in the set.

Accordingly, in another exemplary vehicle policy, fuel costs may be divided and allocated based upon actual usage. In such an embodiment, trip distances, times, and/or fuel usage may be tracked and recoded by the system (e.g., as vehicle telematics data). In some embodiments, trip distance may be tracked by retrieving an odometer reading at the beginning and at the end of a trip. Trip distance and/or time may additionally or alternatively be tracked by receiving a GPS signal (e.g., transmitted to the vehicle and/or to a user computing device within the vehicle) associated with the trip. Trip time may be tracked by determining a start-up time and a power-down time associated with the vehicle (e.g., when a user starts the ignition and when a user turns off the engine, for a gas-powered car). Fuel usage may be tracked by determining a starting fuel level associated with a beginning of the trip and an ending fuel level associated with the end of a trip. In some embodiments, the vehicle may include a fuel level sensor in communication with the system, such that the system may retrieve fuel level signals before, during, and/or after trips.

For each trip, at least one occupant vehicle user may be determined (as described herein), recorded, and associated with the trip. The fuel cost for the trip may then be allocated to the one or more vehicle users associated with the trip. For example, if only one vehicle user is associated with the trip, the entirety of the fuel cost for that trip may be allocated to that one vehicle user. If two vehicle users are associated with the trip, the fuel cost may be divided and allocated between the two vehicle users. In some cases, the fuel cost may be divided equally between the two vehicle users. In other cases, a "driver" vehicle user may have less of the fuel cost allocated thereto to "compensate" the driver for driving.

The system may determine the actual fuel cost by identifying a fuel type associated with the vehicle and a cost of that fuel at the time of the trip. Alternatively, the system may determine relative percentages used of the fuel of the vehicle based upon the trips associated with each vehicle user, and may divide and allocate fuel cost to each vehicle user at the time of re-fueling. For example, for a gas-driven vehicle, the vehicle users may not refuel after each trip. At the time of refueling, one of the vehicle users may refuel the vehicle with 20 gallons of fuel at a cost of $40.00. Based upon the actual usage/fuel consumption of the set of vehicle users associated with the vehicle, User A consumed 50% of the fuel, User B consumed 25% of the fuel, and User C consumed 25% of the fuel. In one embodiment, according to one vehicle policy, User A would have $20.00 of fuel cost allocated thereto, User B would have $10.00 of fuel cost allocated thereto, and User C would have $10.00 of fuel cost allocated thereto.

Maintenance Costs

"Maintenance costs" may be associated with regular, scheduled maintenance on the vehicle. "Regular" and/or "scheduled" may refer generally to manufacturer-set or recommended maintenance schedules for various components of the vehicle. Without limitation, some examples of maintenance costs include costs associated with oil changes, air filter replacement, replacement of wiper blades, and tire rotation and/or alignment. Maintenance costs may also be associated with legal maintenance of ownership of the vehicle, such as vehicle-associated property taxes, registration fees, title fees, etc. Maintenance costs may be divided and/or allocated to vehicle users, according to one or more agreed-upon vehicle policies associated with maintenance costs.

In one exemplary vehicle policy, maintenance costs (including legal maintenance costs) may be divided and allocated equally between all vehicle users associated with the vehicle, because regular vehicle maintenance may increase the longevity of the vehicle and, accordingly, may benefit all vehicle users equally. In another exemplary embodiment, certain maintenance costs, such as oil change costs, may be divided and allocated between vehicle users in accordance with their vehicle usage, because such maintenance may be correlated with vehicle usage (e.g., an oil change may be recommended every 3,000 miles).

Incidental Costs

"Incidental costs" may be associated with costs that may not fall into any other category and may be further associated with specific and/or one-time events. Without limitation, some examples of incidental costs include costs associated with accidents, flat tires, highway tolls, and tickets. Incidental costs may be divided and/or allocated to vehicle users, according to one or more agreed-upon vehicle policies associated with incidental costs.

In one exemplary vehicle policy, incidental costs may be divided and allocated equally between all vehicle users associated with the vehicle. These kinds of vehicle policies may be preferable to a set of vehicle users who wish to share risk equally, such that no one vehicle user will be penalized for one-time incidentals such as accidents. In another exemplary vehicle policy, certain incidental costs will be shared equally, such as costs associated with an accident in which no vehicle user was at fault (e.g., caused by another party), but other incidental costs will be allocated only to the vehicle user associated with the corresponding incident, such as a toll cost incurred by one user driving on the highway. In yet another exemplary vehicle policy, all incidental costs are allocated only to the vehicle user(s) associated with the incident in which the cost is incurred (e.g., even in the accident referenced above, only the vehicle user(s) in the vehicle at the time of the accident will have associated incidental costs of repair allocated thereto).

Determining Occupants of the Vehicle

In at least some cases, the vehicle user that is acting as a driver for a trip in the vehicle may have a particular cost allocation associated with the driver role. For example, as described herein, insurance costs and/or incidental costs may be set and/or allocated in a particular way depending upon which vehicle user is the driver for a trip. Accordingly, it may be beneficial to employ one or more methods of determining which vehicle user is acting as the driver of the trip.

In the exemplary embodiment, the vehicle may include a communication device that allows it to communicate with other devices, for example, via the Internet or any other wired or wireless connection (e.g., Bluetooth®) over one or more radio links or wireless communication channels. In the exemplary embodiment, the vehicle may be in communication with one or more user computing devices that are each associated with one of the vehicle users. In some embodiments, the vehicle may have "application pairing" functionality via the communication device, such that vehicle users may engage with an app on a user interface at the vehicle and/or on their user computing device (e.g., their smartphone). In one embodiment, at the beginning and/or at the end of a trip, the app may prompt selection of which vehicle user is/was the driver of the trip, and the VCA computing device may record the selected driver as the driver for the trip. While this "honor system" embodiment may be relatively simple, it should be understood that it may invite errors, either intentional or unintentional. Errors may, in turn, invite disputes. Accordingly, this "honor system" embodiment may be supplemented and/or replaced by another method of determining the driver of a trip.

Additionally or alternatively, this method may be employed as a validation or verification to one or more other determination methods. For example, after a trip in which the driver is determined using another method, the app may prompt confirmation that the determined driver was, in fact, the driver of the trip. The VCA computing device may receive an indication of a positive or negative response to the prompt, and update records for the trip accordingly. This confirmation may serve to avoid disputes. Additionally or alternatively, this method of manually selecting which vehicle user(s) are present in the vehicle during the trip may be used by the VCA computing device to determine which, if any, other vehicle users are within the vehicle as passengers during the trip (which may affect division and allocation of various vehicle costs, as described herein).

Using the application pairing functionality, the VCA computing device may further determine which user computing device(s) are within the vehicle during a trip. For example, each user may pair one or more user computing devices (e.g., smartphones, tablets, laptops, wearables, etc.) to the vehicle. The vehicle may then pair with one or more user computing devices that are within the car during a trip. The vehicle may record which device(s) pair with the vehicle for a trip and send an indication of such to the VCA computing device. If only one user computing device pairs with the vehicle, the VCA computing device may record the vehicle user associated with that user computing device as the driver for the trip. If more than one user computing device pairs with the vehicle, the VCA computing device may request selection and/or confirmation of which associated vehicle user is the driver for the trip, as described above (e.g., using an in-vehicle app and/or an app on the user computing device). Additionally or alternatively, this method of recording paired user computing devices may be used in determining which, if any, other vehicle users are within the vehicle as passengers during the trip (which may affect division and allocation of various vehicle costs, as described herein).

In still other embodiments, the VCA computing device may use additional and/or alternative vehicle telematics data, such as sensor information from sensors within a paired user computing device, to determine which vehicle user is the driver when multiple user computing devices pair with the vehicle during a single trip. In one example, the VCA computing device may use gyroscope and/or accelerometer sensor information from the paired user computing devices to identify which side of the vehicle each user of a user computing device used to enter the vehicle and/or exit the vehicle. In other words, the VCA computing device may access and process data from the gyroscope and/or accelerometer for each user computing device to determine whether the user of the user computing device entered the vehicle on the left (e.g., driver) or the right (e.g., passenger). If only two user computing devices are present and the VCA computing device determines that a first device is associated with the left side of the vehicle and a second device is associated with the right side of the vehicle, the VCA computing device may record that the user associated with the first device is the driver and the user of the second device is a passenger for the trip. If more than one device is associated with the left side of the vehicle (e.g., the driver's side), the VCA computing device may employ one or more other methods described herein to determine the driver of the vehicle. It should be understood that although the left side is associated with a "driver's side" and the right side is associated with a "passenger side" herein, as is the custom in the United States of America, this method is easily applied to other driving customs in which the left side is a passenger side and the right side is the driver's side.

Another method of determining the driver of a trip may include providing vehicle user-specific keys. When the vehicle is obtained by the set of vehicle users, each may receive a user-specific key fob (or other device, such as a mobile device, i.e., smartphone or wearable electronics), which is registered to that specific user. The vehicle users may sign a contract or other agreement that each vehicle user will only use the key specific to his- or herself, which may encourage the vehicle users to carefully and consistently only use their specific key. When the user-specific key is employed to unlock and/or start the vehicle (e.g., in keyless start vehicles), the vehicle may record which key is used, and, therefore, may indicate to the VCA computing device which vehicle user to designate as the driver for the trip. Additionally or alternatively, location-sensitive tracking may be used to determine which user-specific key is within the vehicle during the trip. If only one user-specific key is sensed, the vehicle may record which user-specific key was sensed, and the VCA computing device may automatically designate the associated vehicle user as the driver. This location-sensitive tracking may be further used in determining which, if any, other vehicle users are within the vehicle as passengers during the trip (which may affect division and allocation of various vehicle costs, as described herein).

Moreover, in some embodiments, the vehicle and/or a paired user computing device may be configured to track driving characteristics of the vehicle and/or the driver of the vehicle during the trip. Additionally or alternatively, a separate computing device may be provided for use with the vehicle (e.g., may be "plugged in" or otherwise coupled to the vehicle) that tracks driving characteristics. "Driving characteristics" may include, for example (but not limited to), sudden acceleration/deceleration, average speed, average stopping distance, and driving efficiency, as well as times the vehicle is driven, distance driven, and/or location information of the trip. Using the manual user selection method, the paired-device method, and/or the user-specific key method(s) described above, the VCA computing device may associate certain trips with specific vehicle users until driving characteristics may be associated with particular vehicle users. The VCA computing device may employ machine learning functionality to develop and maintain "driver profiles" for each of the vehicle users, such that the VCA computing device may use the driver profiles to identify which vehicle user is the driver for future trips. For example, driving 15 miles in the morning at average speeds of 50 mph and with few sudden decelerations may be associated with User A (e.g., a commuting user) for a dozen trips using one or more of the above methods, such that any other trips that share some or all of these characteristics may be automatically associated with User A (e.g., without using any or all of the above methods).

In still other embodiments, the vehicle may include and employ one or more biometric sensors to determine which vehicle user is the driver for a trip. Biometric sensors may include any sensor configured to receive a biological signal uniquely identifying an individual, such as, but not limited to, retinal scanners, fingerprint scanners, facial recognition devices, and weight scales. In one example, the vehicle may have one or more fingerprint scanners on a component of the vehicle only easily accessible by the driver, such as the dashboard, the console or the steering wheel. In another example, the vehicle may have a weight scale (or pressure sensor) associated with the driver's seat and/or with the passenger's seats. The vehicle may have a registered weight associated with each vehicle user. When any vehicle user sits in any of the seats, their weight may be measured by the scale and the particular vehicle user may be identified. The VCA computing device may then record the position of each vehicle user within the vehicle for a trip, to determine which vehicle user is the driver and/or a particular passenger.

In some embodiments, if the VCA computing device is unable to determine which vehicle user is a driver, when more than one vehicle user is known to be in the vehicle during a trip (e.g., by determining that more than one user computing device paired with the vehicle during the trip), the VCA computing device may equally divide all costs associated with the trip to each of the more than one vehicle users.

EXEMPLARY EMBODIMENTS

A vehicle cost allocation system for vehicles with shared ownership, usage, and/or costs may be provided. The amount of shared usage or costs may be determined based upon vehicle and/or telematics data (which may include vehicle trip, miles, GPS, vehicle operation and other types of vehicle telematics data). For instance, several users may live in the same community or apartment building, and collectively own or lease an autonomous vehicle for use by all of the users in the group.

In one aspect, an Application ("App") may be built that tracks vehicle use for each of the joint owners/lessees. The App may be employed on a vehicle controller of a smart, semi-autonomous, or autonomous vehicle, and/or be employed on each user's mobile device within a group of vehicle owners or lessees. Lease payments and insurance payments for the collectively owned or leased vehicle may be split accordingly based upon individual drivers and/or passengers in the vehicle for each trip. Insurance rates, including usage-based insurance rates and discounts, may be based upon driving history, usage, traditional insurance rating factors, and other telematics data (such as braking, acceleration, cornering, and other types of telematics data).

Billing may be embedded within the App, which may be installed on the vehicle or mobile devices of the owners/lessees. For instance, the App may support virtual billing and virtual financial account accounts. Additionally or alternatively, virtual bills may be sent separately with the App used only to collect user, vehicle, and/or telematics data and determine costs.

Rates and payments based upon collective and/or individual vehicle usage may prevent each of the joint owners or lessees from paying more than their fair share. Lease payments may be automatically be adjusted based upon usage. Thus, risky driving by one of the joint owners may not impact the insurance rates of the other joint owners in some embodiments.

When more than one owner is in the vehicle for a trip, incentives may be given for letting the safest driver drive (to get the lowest rate per mile). The insurance for a given trip may be usage-based insurance, and determined based upon the number of miles or length of trip, the location of the trip, the type of vehicle, the autonomous features of the vehicle, etc. The savings on the insurance costs and lease payments may be split among all of the occupants to incentivize risk averse behavior. That way, when carpooling, every occupant may have an incentive for the driver to drive safely.

Both lease payments and insurance payments may be adjusted to account for trips in which the vehicle is driven in an autonomous mode, especially if the autonomous mode is proven to be safer than human driving.

Telematics data may be collected from various sources, including the vehicle, the smartphones or wearables of the lessees/drivers/passengers, and other external telematics data collection devices. Examples of data elements include time driven, miles driven, occupants, and other road type and weather data.

Payments may be made semi-annually or automatically at the conclusion of each trip, including payments for usage-based insurance. Payments may also be made via an account with credit/debits for pay-by-the mile pricing. Further, the App may display a list of trips, usage, and costs for each lessee/owner. A joint account for all of the lessees/owners may also be set for gas, maintenance, oil changes, tire rotations/replacements, toll roads, parking, and other costs that may be used to pro-rate costs across lessees.

The present embodiments may offer (i) pro-rated insurance payments based upon usage between joint owners from separate households using a telematics device; (ii) pro-rated lease payments based upon actual vehicle usage; and (iii)

pro-rated vehicle costs based upon actual vehicle usage. The present embodiments also include providing incentives tailored to policyholders with shared ownership of a vehicle to encourage safer drivers to drive, as well as the use of proven autonomous driving features.

In one embodiment, a computer-implemented method for allocating vehicle cost between users of an autonomous vehicle may be provided. The method may be implemented using a vehicle cost allocation (VCA) computing device including a processor in communication with a memory. The method may include (1) receiving, via one or more processors, transceivers, and/or sensors (such as via wireless communication or data transmission over one or more radio links or wireless communication channels), a potential trip report associated with a potential future trip to be performed using an autonomous vehicle (such as from an autonomous vehicle transceiver or a user mobile device), the potential trip report associated with the autonomous vehicle and may include an identification of an anticipated passenger, the potential trip report further including an anticipated origination point and a destination point; (2) retrieving, via the one or more processors, (a) insurance policy information associated with the autonomous vehicle, and (b) autonomous feature capabilities of the autonomous vehicle for a memory unit; (3) determining, via the one or more processors, a usage-based insurance amount for the trip based upon (a) the potential trip report, (b) the insurance policy information, and/or (c) autonomous feature capabilities of the autonomous vehicle; (4) transmitting, via the one or more processors and/or transceivers, the usage-based insurance amount to the anticipated passenger's mobile device for review and/or acceptance; and/or (5) upon acceptance, allocating, via the one or more processors, the usage-based insurance amount to a financial account associated with the anticipated passenger to facilitate sharing costs among joint owners or lessees of autonomous vehicles. The method may include additional, less, or alternate actions, including those discussed elsewhere herein.

For instance, the method may include retrieving, via the one or more processors, an identification of several joint owners or lessees of the autonomous vehicle from a memory unit; determining, via the one or more processors, incidental costs for the trip; and/or allocating, via the one or more processors, the incidental costs among the several joint owners or lessees of the autonomous vehicle.

The method may include receiving, via the one or more processors, transceivers, and/or sensors, telematics data from the autonomous vehicle transceiver and/or a passenger's mobile device, the telematics data indicating operation and usage related data of the autonomous vehicle and/or autonomous features mounted thereon; and/or performing, via the one or more processors, one or more actions based upon the telematics data. The one or more actions may include: updating, via the one or more processors, a risk profile for the autonomous vehicle based upon the telematics data; and/or calculating, via the one or more processors, a usage-based insurance rate, premium, or discount for the autonomous vehicle based upon the telematics data received associated with the autonomous vehicle.

In another embodiment, a computer system configured to allocate vehicle cost between users of an autonomous vehicle may be provided. The computer system may include a vehicle cost allocation (VCA) computing device including a processor in communication with a memory. The computer system may include one or more processors, transceivers, and/or sensors configured to: (1) receive, via wireless communication or data transmission over one or more radio links or wireless communication channels, a potential trip report associated with a potential future trip to be performed using an autonomous vehicle (transmitted from an autonomous vehicle transceiver or a user mobile device), the potential trip report associated with the autonomous vehicle and including an identification of an anticipated passenger, the potential trip report further including an anticipated origination point and a destination point; (2) retrieve (a) insurance policy information associated with the autonomous vehicle, and/or (b) autonomous feature capabilities of the autonomous vehicle for a memory unit; (3) determine a usage-based insurance amount for the trip based upon (a) the potential trip report, (b) the insurance policy information, and/or (c) autonomous feature capabilities of the autonomous vehicle; (4) transmit the usage-based insurance amount to the anticipated passenger's mobile device for review and/or acceptance; and/or (5) upon receipt of acceptance, allocating, via the one or more processors, the usage-based insurance amount to a financial account associated with the anticipated passenger to facilitate sharing costs among joint owners or lessees of autonomous vehicles. The computer system may be configured with additional, less, or alternate functionality, including that discussed elsewhere herein.

For instance, the system may be configured to: retrieve an identification of several joint owners or lessees of the autonomous vehicle from a memory unit; determine incidental costs for the trip; and/or allocate the incidental costs among the several joint owners or lessees of the autonomous vehicle.

The computer system may be further configured to receive telematics data from the autonomous vehicle transceiver and/or a passenger's mobile device, the telematics data indicating operation and usage related data of the autonomous vehicle and/or autonomous features mounted thereon; and/or perform one or more actions based upon the telematics data. The one or more actions may include: updating, via the one or more processors, a risk profile for the autonomous vehicle based upon the telematics data; and/or calculating, via the one or more processors, a usage-based insurance rate, premium, or discount for the autonomous vehicle based upon the telematics data received associated with the autonomous vehicle.

Other Considerations

It is contemplated that systems and methods described herein are applicable equally to user-driven vehicles and self-driving or autonomous vehicles. Accordingly, vehicle users associated with a self-driving vehicle may have additional and/or alternative vehicle policies associated with self-driving capabilities of the self-driving vehicle. For example, one vehicle policy may be associated with division and/or allocation of costs for times when the self-driving vehicle is unoccupied (e.g., when driving between homes of the vehicle users and/or from one vehicle user to another). Such "unoccupied" trips may have specific and/or different costs associated therewith. For example, insurance costs may be lower for such trips (assuming a low accident rate associated with the self-driving vehicle) or may be higher for such trips (assuming low confidence in an unoccupied vehicle), depending upon the insurance policy associated with the vehicle. Fuel costs may be lower for such trips, in such embodiments where the self-driving vehicle drives more efficiently than one or more of the vehicle users.

In one case, the vehicle users may agree upon a vehicle policy in which all costs associated with these "unoccupied" trips are divided and allocated equally between them. In another case, the vehicle users may agree upon a vehicle policy in which costs are divided and/or allocated between users associated with the trip although not physically present. For example, if an unoccupied trip is driven between the home of User A to the home of User B, both User A and User B may be associated with such a trip, as each is associated with one of the starting point and the destination. The costs for such a trip (e.g., insurance and/or fuel costs) may be thus be divided and allocated between User A and User B, but not between another User C.

Moreover, in some cases, certain liabilities associated with an unoccupied self-driving vehicle may be maintained by a vehicle manufacturer associated with the self-driving vehicle. In such cases, the VCA computing device may reduce and/or eliminate certain costs associated with unoccupied trips (e.g., reduce and/or eliminate insurance costs).

In addition, one or more passenger vehicle users may be present during a trip driven by the self-driving or autonomous vehicle, as opposed to being driven by a human driver. In such embodiments, one vehicle policy may be associated with division and/or allocation of costs for times when the self-driving vehicle is self- or vehicle-driven (i.e., not operated by a human driver). Such "vehicle-driven" trips may have specific and/or different costs associated therewith. For example, insurance costs may be lower for such trips (assuming a low accident rate associated with the self-driving vehicle) or may be higher for such trips (assuming low confidence in a self-driven but occupied vehicle), depending upon the insurance policy associated with the vehicle. Fuel costs may be lower for such trips, in such embodiments where the self-driving vehicle drives more efficiently than one or more of the vehicle users. Costs associated with vehicle-driven trips may be divided and allocated (e.g., equally) between the vehicle user(s) present in the vehicle during the vehicle-driven trip.

As another consideration, it is contemplated that other people may drive and/or be present in the vehicle other than the vehicle users, such as spouses and/or children of the vehicle users. These people are referred to herein as "alternate users." The vehicle users may agree upon one or more vehicle policies associated with alternate users.

For example, one vehicle policy may require alternate users to be "registered" with a usage profile of the respective vehicle user with which they are associated (e.g., a child must be registered to the usage profile of their parent(s)), such that costs of the alternate user may be allocated to the associated vehicle user. The users may be required to provide their permission or affirmative consent for data collection, generation, and usage related to the embodiments discussed herein. One vehicle policy may include adjustments to other vehicle policies in the case of an alternate user driving the vehicle. For example, if a teenager is registered as an alternate user and carries a higher insurance risk level, the parent vehicle user may have more of an insurance cost allocated thereto than usual.

Another vehicle policy may strictly prohibit the driving of the vehicle by anyone other than a vehicle user.

The methods and system described herein may be implemented using computer programming or engineering techniques including computer software, firmware, hardware, or any combination or subset. As disclosed above, at least one technical problem with current vehicle sharing systems is that there is a need for enabling vehicle users to choose exactly how they, as a group, want to split each particular kind of vehicle cost. Without having vehicle policies specific to the vehicle users, disputes may more easily arise, and some costs may go unpaid, as a result of those disputes and/or as a result of confusion that may arise regarding each vehicle user's respective portion of the vehicle costs. Moreover, many prior vehicle cost payees, such as insurance companies and/or vehicle manufacturers, may not be equipped to divide and allocate costs, especially when vehicle users agree upon complex vehicle policies regarding cost sharing, such as those based upon actual vehicle usage. A serious technical problem arises in determining individual vehicle user usage of the vehicle in order to implement the agreed-upon vehicle policies. More specifically, current cost-sharing systems provide no way to determine which of the vehicle users are actually present on a trip and, therefore, are at least partially responsible for the costs associated with that trip. In addition, there is a need for a system configured to track and aggregate usage and associated costs. The system and methods described herein address that technical problem.

The technical effect of the systems and processes described herein may be achieved by performing at least one of the following steps, with vehicle owner or user permission or affirmative consent: (i) receiving a plurality of trip reports associated with a corresponding plurality of trips performed using a vehicle within a predetermined interval of time, wherein each trip of the plurality of trips is associated with one or more vehicle users of a plurality of vehicle users associated with the vehicle; (ii) generating a total vehicle usage report based at least in part upon the plurality of trip reports, wherein the total vehicle usage report describes the total usage of the vehicle by the plurality of vehicle users over the interval of time; (iii) determining a total vehicle cost associated with the vehicle over the interval of time based at least in part upon the total vehicle usage report; (iv) generating a respective user usage report associated with each vehicle user of the plurality of vehicle users, based at least in part upon one or more trip reports of the plurality of trip reports associated with the corresponding vehicle user; (v) determining a respective vehicle user cost attributable to each vehicle user of the plurality of vehicle users based at least in part upon the corresponding user usage report for the corresponding vehicle user and the total vehicle cost; and/or (vi) allocating each respective vehicle user cost to the corresponding vehicle user.

The resulting technical effect is that the vehicle costs associated with use and ownership of the vehicle are accurately and equitably (e.g., according to the particular set of vehicle users) split between all vehicle users. When costs are divided and allocated according to explicitly agreed-upon vehicle policies, the frequency of disputes over cost allocation may be reduced. A solution to the above-described problems provided by the system is determination of which vehicle user(s) are associated with each trip such that vehicle policies may be implemented by the system. The system includes a plurality of methods for determining occupants and/or a driver of a vehicle during a trip, as described more fully herein. Some of these methods including using sensor and/or biometric data, assessing other presence indicators such as paired devices and/or user-specific keys, and requesting selection/verification of user presence from a vehicle user. Moreover, by managing payments using the systems and methods described herein, the vehicle users may be ensured precise and accurate payment of only their share of the vehicle costs.

Exemplary System

FIG. 1 depicts a schematic diagram of an exemplary shared vehicle system 100. Shared vehicle system 100 is configured to enable tracking of trips and costs associated with a vehicle 104 and divide and allocate those costs between one or more vehicle users associated with the vehicle 104 and/or the trips. In one exemplary embodiment, system 100 may include and/or facilitate communication between one or more vehicle cost allocation (VCA) computing devices 102, a vehicle 104, a memory device 108, one or more user computing devices 110 (each associated with a respective vehicle user, not shown), an insurance server 112, and one or more financial institutions 114.

VCA computing device 102 may be any device capable of interconnecting to the Internet, including a server computing device, a mobile computing device or "mobile device," such as a smartphone, a personal digital assistant (PDA), a tablet, a wearable device (e.g., a "smart watch" or a personal projection device such as "smart glasses"), a "phablet," or other web-connectable equipment or mobile devices. Components of system 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In one embodiment, vehicle 104 may include VCA computing device 102. In other words, VCA computing device 102 may be located in vehicle 104.

Additionally, a database server 106 may be connected to memory device 108 containing information on a variety of matters. For example, memory device 108 may include such information as trip reports, usage reports associated with respective vehicle users, rolling or progressive vehicle costs, allocated costs associated with the respective vehicle users, vehicle policies, financial account and/or payment information associated with the respective vehicle users, paired user computing devices, driving characteristics, dispute records, and/or any other information used, received, and/or generated by shared vehicle system 100, as described herein. In one exemplary embodiment, memory device 108 may include a cloud storage device, such that information stored thereon may be accessed by one or more components of shared vehicle system 100, such as, for example, VCA computing device 102, user computing device 110, insurance server 112, and/or vehicle 104. In one embodiment, memory device 108 may be stored on VCA computing device 102. In any alternative embodiment, memory device 108 may be stored remotely from VCA computing device 102 and may be non-centralized. Moreover, in any alternative embodiment, memory device 108 may be stored on insurance server 112.

VCA computing device 102 may be in communication with vehicle 104, one or more user computing device 110, insurance server 112, and/or one or more financial institutions 114, such as via wireless communication or data transmission over one or more radio frequency links or wireless communication channels. In the exemplary embodiment, user computing devices 110 may be computers that include a web browser or a software application to enable VCA computing device 102 and/or vehicle 104 to access user computing devices 110, and vice versa, using the Internet or a direct connection, such as a cellular network connection. More specifically, user computing devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computing devices 110 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Additionally, user computing devices 110 may be communicatively coupled to VCA computing device 102 and/or vehicle 104 through many interfaces including, but not limited to, a direct cable connection, a Bluetooth® connection, and a Wi-Fi connection.

Vehicle 104 may include any kind of vehicle, such as, for example, cars, trucks, all-terrain vehicles (ATVs), motorcycles, autonomous vehicles, semi-autonomous vehicles, recreational vehicles (RVs), snowmobiles, boats, industrial vehicles (e.g., construction vehicles), "riding" lawnmowers, and/or any kind of vehicle. Generally, vehicles 104 will be described herein using cars/trucks (e.g., personal vehicles) as examples. However, these examples should not be construed to limit the disclosure in any way, as the scope of the present disclosure may be applicable to any kind of vehicle, including those listed hereinabove. In the exemplary embodiment, vehicle 104 includes a communication device (not shown in FIG. 1) such that vehicle 104 may communicate with VCA computing device 102, user computing devices 110, memory device 108, and/or insurance server 112, for example, via the Internet. Vehicle 104 may further include a user interface (not shown in FIG. 1) such that vehicle users of vehicle 104 may access certain features of vehicle 104 (e.g., the communication device, one or more apps, "infotainment" features, climate control, etc.).

As described herein, vehicle 104 may be associated with a plurality of vehicle users that share one or more costs associated with vehicle 104, in exchange for use of vehicle 104. For example, the vehicle users may be co-owners, co-lessees, and/or co-renters of vehicle 104. The vehicle users may agree upon one or more vehicle policies that describe how costs will be divided and allocated between one another, various examples of which are provided herein.

In some embodiments, VCA computing device 102 may be associated with a cost allocation service. Vehicle users may register or sign up with the cost allocation service to access the cost allocation functionality of VCA computing device 102. In some embodiments, VCA computing device 102 may be associated with an insurance company (e.g., associated with insurance server 112). Vehicle users may be provided the cost allocation functionality of VCA computing device 102 upon purchasing an insurance policy associated with vehicle 104. In some embodiments, VCA computing device 102 is associated with a manufacturer, seller, lessor, and/or rental agency of vehicle 104, such that vehicle users may be provided the cost allocation functionality of VCA computing device 102 upon purchasing, leasing, and/or renting vehicle 104.

Vehicle users may transmit their agreed-upon vehicle policies to VCA computing device 102. VCA computing device 102 may process the vehicle policies and store the vehicle policies in memory device 108. In some embodiments, VCA computing device 102 may be configured to divide and allocate every vehicle cost associated with vehicle 104 on behalf of the vehicle users. In other embodiments, VCA computing device 102 may be configured to divide and allocate less than all of the vehicle costs associated with vehicle 104, as decided upon by one or more vehicle users. For example, vehicle users may request that VCA computing device 102 divide and allocate all vehicle costs associated with actual usage of the vehicle (e.g., fuel costs, insurance costs, etc., in some examples), but not any vehicle costs that will be split evenly between the vehicle users (e.g., maintenance costs, in some examples). It should be understood that VCA computing device 102 may be configured to divide and allocate any combination of vehicle costs associated with vehicle 104.

In some embodiments, VCA computing device 102 may be further configured to manage payment(s) of one or more vehicle costs on behalf of the vehicle users. In such embodiments, each vehicle user may maintain a payment account associated with the cost allocations services of VCA computing device 102, as described herein. VCA computing device 102 may withdraw and/or cause withdrawal of funds in amounts corresponding to the respective allocated portions of vehicle costs. VCA computing device 102 may further transfer and/or cause transfer of those funds to one or more parties associated with the vehicle costs (e.g., an insurance provider associated with the insurance cost, a car dealership or financial institution 114 associated with asset costs, a repair shop associated with a maintenance cost, etc.). In some embodiments, VCA computing device 102 may alternatively withdraw funds in amounts corresponding to the respective allocated portions of vehicle costs and transfer those funds to one financial account (e.g., maintained at a financial institution 114 associated with VCA computing device 102), and may further cause payments to be made to other parties from that one financial account.

In other embodiments, the vehicle users maintain respective payment accounts at respective financial institutions 114. VCA computing device 102 may be configured to transmit instructions to each financial institution 114 to transfer the amount of funds corresponding to the respective vehicle user's portion of one or more vehicle cost(s) to a financial institution 114 associated with that one or more vehicle cost(s). In still other embodiments, VCA computing device 102 may divide and allocate vehicle costs between the vehicle users, as described herein, and transmit a message to each vehicle user (e.g., to a user computing device 110 associated therewith) indicating the respective amounts of each vehicle cost to be paid by that vehicle user to an associated party. In other words, VCA computing device 102 may not manage the transfer of funds but may indicate to the vehicle users how much they are obliged to pay each party according to their vehicle policies.

Financial institution 114 may include any financial institution associated with any component of system 100, one or more vehicle users, and/or a party to which payment is owed according to the vehicle cost(s) associated with vehicle 104. For example, financial institution 114 may include a bank, at which one or more payment account(s) is maintained, that payment account(s) associated with any component of system 100, one or more vehicle users, and/or a party to which payment is owed according to the vehicle cost(s) associated with vehicle 104.

Insurance server 112 may be associated with and/or maintained by an insurance provider, which provides an insurance policy associated with vehicle 104. Insurance server 112 may communicate with VCA computing device 102, vehicle 104, user computing device(s) 110, and/or memory device 108 in order to transmit and/or receive information associated with the insurance policy. For example, insurance server 112 may transmit insurance cost information associated with the respective vehicle users to VCA computing device 102. As another example, insurance server 112 may retrieve usage report information from memory device 108 to analyze the driving characteristics and/or other usage information of one or more vehicle users, for example, to update an insurance policy associated with vehicle 104.

Exemplary Vehicle Cost Allocation Computing Device

Figure 2:
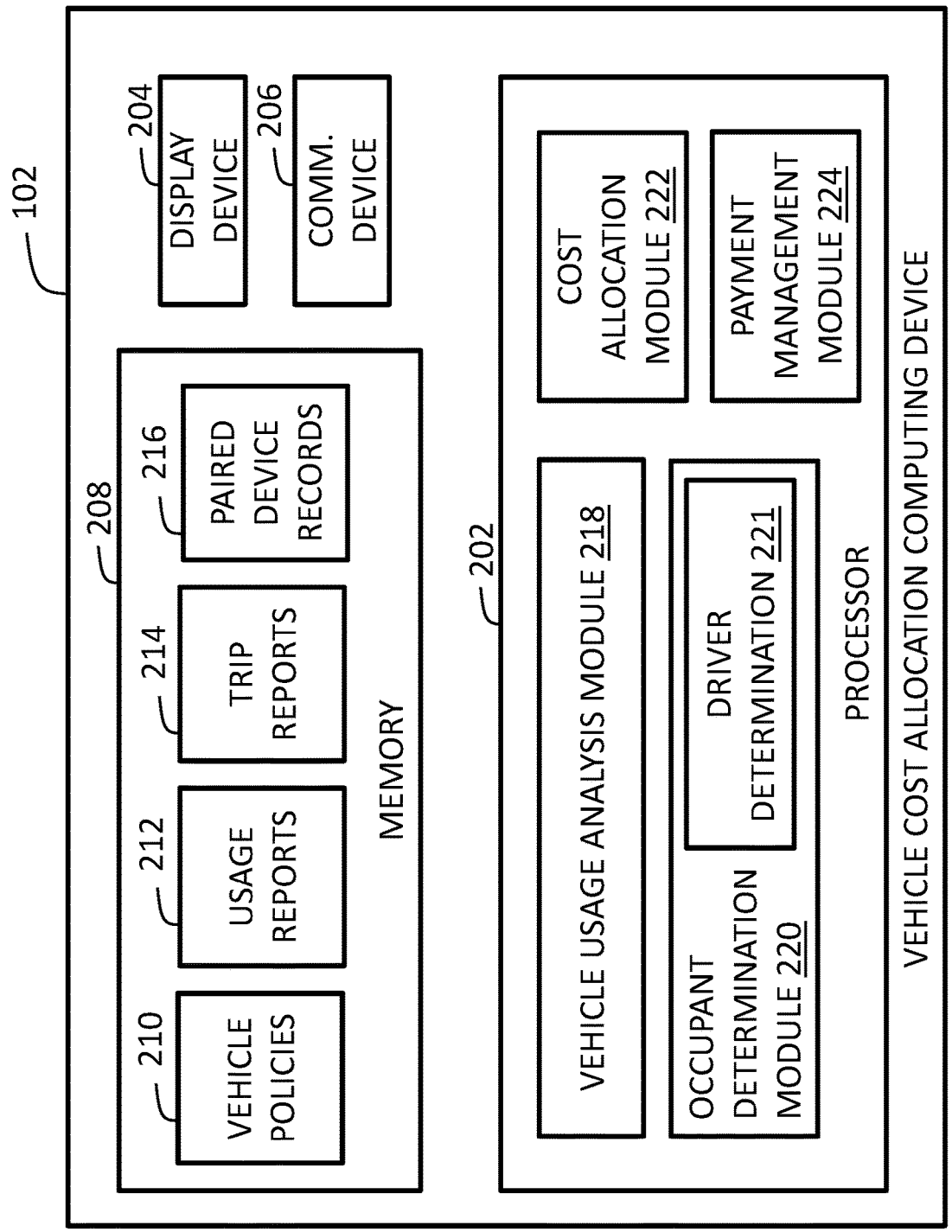
FIG. 2 illustrates a schematic diagram of an exemplary vehicle cost allocation (VCA) computing device that may be used in the shared vehicle system shown in FIG. 1.

FIG. 2 depicts a schematic diagram of an exemplary VCA computing device 102 (as shown in FIG. 1). In one exemplary embodiment, VCA computing device 102 may include a processor 202, a display device 204, a communication device 206, and a memory 208 (which may be similar to memory device 108, shown in FIG. 1). Processor 202 may be configured to execute a plurality of modules, as described further herein.

Display device 204 may be configured to display output from processor 202. Display device 204 may include a physical display device (e.g., a screen or monitor) and/or may include computer-executable instructions that, when executed, cause display of a virtual user interface, for example, at a user computing device 110 (shown in FIG. 1). In other words, display device 204 may include functionality to display an app, including an interactive user interface, at another computing device, to enable input to VCA computing device 102 as well as display of output from VCA computing device 102.

Communication device 206 may be any device configured to enable communication between VCA computing device 102 and any other computing device (e.g., user computing device 110, vehicle 104, etc.) over a wired or wireless connection. Communication device 206 may include, for example, a wired or wireless network adapter and/or a wireless data transceiver for use with a mobile telecommunications network.

Memory 208 may be configured to store information, such as, for example, vehicle policies 210, usage reports 212, trip reports 214, and/or paired device records 216. Vehicle policies 210 may be received and/or stored during and/or after a registration phase, in which all vehicle users agree upon each vehicle policy 210. Each vehicle policy 210 describes how the vehicle users have agreed to handle, divide, allocate, and/or otherwise manage vehicle costs. Usage reports 212 may be generated and stored by, for example, vehicle usage analysis module 218, as described further herein.

In one exemplary embodiment, VCA computing device 102 may receive trip reports 214 from vehicle 104 and/or one or more user computing devices 110 (both shown in FIG. 1). Each trip report 214 may be associated with a trip performed using vehicle 104. Trip reports 214 may be associated with trips performed within a predetermined interval of time, such as, for example, a billing period, a month, two months, two weeks, or any other interval of time. Each trip described in a trip report 214 may be further associated with one or more of the vehicle users associated with vehicle 104. VCA computing device 102 may receive paired device records 216 from, for example, vehicle 104. Paired device records 216 may refer generally to reports of which paired devices (e.g., user computing devices 110) paired with vehicle 104 during a trip and/or indications of which vehicle user is associated with each paired device. It should be understood that memory 208 may be configured to store more, less, and/or different information, including any other information described herein.

In one exemplary embodiment, processor 202 may include a vehicle usage analysis module 218, an occupant determination module 220, a driver determination submodule 221, a cost allocation module 222, and a payment management module 224. It should be understood that these modules are illustrative only, and that any of the functionality of any module described herein may be performed by any other module and/or be generally performed using processor 202.

In one embodiment, VCA computing device 102 may receive a request for usage analysis, the request including vehicle data identifying vehicle 104 from which VCA computing device 102 may identify the vehicle users associated with vehicle 104. Vehicle usage analysis module 218 may access trip reports 214 and vehicle policies 210 to generate a total vehicle usage report. The total vehicle usage report describes the total usage of vehicle 104 by the vehicle users over the interval of time. In other words, vehicle usage analysis module 218 may develop a report of the total usage of vehicle 104, including, for example, time driven, fuel used, any maintenance performed, mileage driven, types of trips, etc. Based at least in part upon the total vehicle usage report, vehicle usage analysis module 218 may determine a total vehicle cost associated with vehicle 104 over the interval of time. The total vehicle cost may include a total of all types of costs, including asset costs, fuel costs, maintenance costs, insurance costs, and/or incidental costs.

In some embodiments, to generate the total vehicle usage report and determine the total vehicle cost, vehicle usage analysis module 218 may process and analyze individual trip reports 214 (and associated costs), and aggregate the results of that analysis to generate the total vehicle usage report. Vehicle usage analysis module 218, for a single trip report 214, may determine a time/mileage traveled and/or locations traveled between, for example, to determine a corresponding amount of fuel used and, thus, a fuel cost associated with the trip. Vehicle usage analysis module 218 may also retrieve any maintenance and/or incidental reports (not specifically shown) stored in memory 208 and associated with a particular trip and/or with vehicle 104 in general, for example, to determine maintenance costs and/or incidental costs for a trip and/or for the interval of time. Vehicle usage analysis module 218 may also determine, for a single trip report 214, a usage type of the trip (e.g., road trip vs. errand vs. commute), and/or one or more vehicle user(s) and/or a driver associated with the trip (e.g., by communicating with occupant determination module 220), for example, to determine insurance costs and/or other costs associated with each trip.

Vehicle usage analysis module 218 may be configured to determine certain costs on a per-trip and/or per-interval (e.g., "total") basis. For example, in some embodiments, vehicle usage analysis module 218 may determine a fuel cost associated with each particular trip. Vehicle usage analysis module 218 may parse the trip report 214 for a distance traveled and/or fuel usage, and may calculate a fuel cost for that associated trip based upon a current fuel price. In some embodiments, vehicle usage analysis module 218 may access external database(s) and/or other sources of information to determine a current fuel price.

In some embodiments, vehicle usage analysis module 218 determines a total fuel cost for the entire interval, for example, by requesting a mileage and/or fuel report from vehicle 104. Vehicle 104 may generate and transmit a mileage and/or fuel report by accessing sensor data from, for example, an odometer and/or fuel sensor, respectively. In still other embodiments, vehicle usage analysis module 218 may determine a fuel cost for the interval based upon reported fuel costs and/or payments. Reported fuel payments may be transmitted to VCA computing device 102 by, for example, a vehicle user. The vehicle user may transmit a fuel cost payment receipt to VCA computing device 102, may designate one particular payment method as a fuel cost payment method (e.g., a particular credit or debit card used only for payment of fuel costs, which may be accessible and/or usable by all vehicle users and/or may be associated with an individual or joint financial account associated with one or more vehicle users), and/or may transmit any other indication of a fuel cost payment and/or fuel cost bill to VCA computing device 102.

Similarly, vehicle usage analysis module 218 may determine incidental costs for the interval based upon reported incidental payments. Reported incidental payments may be transmitted to VCA computing device, for example, by a vehicle user. The vehicle user may transmit an incidental cost payment receipt (e.g., a repair bill or toll cost) to VCA computing device 102, may designate one particular payment method as an incidental cost payment method (e.g., a particular credit or debit card used only for payment of incidental costs, which may be accessible and/or usable by all vehicle users and/or may be associated with an individual or joint financial account associated with one or more vehicle users), and/or may transmit any other indication of an incidental cost payment and/or incidental cost bill to VCA computing device 102.

As another example, vehicle usage analysis module 218 may determine maintenance costs for the interval based upon maintenance costs invoices or reports submitted to VCA computing device 102 (e.g., by one of the vehicle users). Vehicle usage analysis module 218 may additionally or alternatively determine an expected maintenance cost based upon an average maintenance cost for that vehicle 104 over the interval. In some embodiments, vehicle usage analysis module 218 may access external database(s) and/or other sources of information to determine an average maintenance cost for vehicle 104 over a particular interval of time. As yet another example, vehicle usage analysis module 218 may determine asset costs for the vehicle 104 based upon one or more monthly payments requested by an asset payee (e.g., a car dealership or auto manufacturer).

Occupant determination module 220 may be configured to determine which of the vehicle users associated with vehicle 104 are associated with a particular trip. For example, occupant determination module 220 may be configured to determine which of the vehicle users were present in vehicle 104 during the trip. In one embodiment, vehicle usage analysis module 218 requests performance of such determination, for example, by transmitting a trip report 214 to occupant determination module 220. Occupant determination module 220 may include a driver determination sub-module 221. When occupant determine module 220 determines that more than one vehicle user is present in vehicle 104 during a trip, occupant determine module 220 may employ driver determination sub-module 221 to determine which of those present vehicle users was the driver for the trip. In at least some cases, the vehicle user that is acting as a driver for a trip in vehicle 104 may have a particular cost allocation associated with the driver role. For example, insurance costs and/or incidental costs may be set and/or allocated in a particular way depending on which vehicle user is the driver for a trip. Any functionality described with respect to occupant determination module 220 may be performed by driver determination sub-module 221, and vice versa.

Occupant determination module 220 may, in one embodiment, employ a "user selection" method of occupant and/or driver determination. In such an embodiment, at the beginning and/or at the end of a trip, under instruction from VCA computing device 102 via the app, vehicle 104 may prompt user selection of one or more vehicle user(s) are present in vehicle 104 for the trip and which vehicle user is/was the driver of the trip. For example, vehicle 104 may display the app at a user interface of vehicle 104 and display such a prompt therein. Vehicle 104 may receive input of the user selection, which identifies the selected vehicle users present on the trip and/or the selected driver, and append the user selection to the trip report 214 associated with that trip. Occupant determine module 220 may then parse the trip report 214 for the user selection and determine the vehicle users identified in the user selection to be the vehicle users associated with the trip. Where a driver vehicle user is identified, driver determination sub-module 221 may determine the driver vehicle user identified in the user selection to be the driver of the trip.

Additionally or alternatively, occupant determination module 220 may employ this "user selection" method as a validation or verification to one or more other determination methods. For example, after a trip in which the driver is determined using another method, under instruction from VCA computing device 102 via the app, vehicle 104 and/or one or more user computing devices 110 may prompt confirmation that the vehicle users determined to be present were, in fact, present on the trip and/or that the determined driver was, in fact, the driver of the trip. Vehicle 104 and/or user computing device 110 may receive an indication, via the app, of a positive or negative response to the prompt, and append the trip report 214 associated with the trip to include the response.

Occupant determination module 220 may additionally or alternatively take advantage of pairing functionality, via the app, between vehicle 104 and user computing device(s) 110 associated with vehicle users. During a trip, vehicle 104 may pair with one or more user computing devices 110 that are within vehicle 104. Vehicle 104 and/or user computing device(s) 110 may generate one or more paired device records 216 associated with the trip report 214 for that trip. Occupant determination module 220 may access paired device records 216 associated with the trip report 214 and determine the vehicle user(s) associated with the paired user computing device(s) 110 identified in the paired device record 216 to be the vehicle user(s) associated with the trip. If only one paired device record 216 is associated with the trip report 214, indicating that only one user computing device 110 paired with vehicle 104, driver determination sub-module 221 may determine the vehicle user associated with the single paired user computing device 110 to be the driver for the trip. If vehicle 104 and/or user computing device(s) 110 generate more than one paired device record 216 associated with a trip report 214, vehicle 104 and/or the user computing device(s) 110 may, under instruction from VCA computing device 102 via the app, request user selection of which vehicle user is the driver for the trip, as described above.

Occupant determination module 220 may additionally or alternatively take advantage of sensor data from sensors in vehicle 104 and/or user computing device(s) 110 (e.g., paired user computing device(s) 110). In one example, user computing device(s) 110 may generate sensor data from a gyroscope and/or accelerometer sensor. User computing device(s) 110 may transmit the sensor data to vehicle 104 and/or VCA computing device, and/or may append the sensor data to the trip report 214 for a trip, under instruction from VCA computing device 102 via the app. Occupant determination module 220 may analyze the sensor data to identify which side of vehicle 104 each user of a respective user computing device 110 used to enter vehicle 104 and/or exit vehicle 104. In other words, occupant determination module 220 may access and process the sensor data from the gyroscope and/or accelerometer for each user computing device 110 to determine whether the user of the user computing device 110 entered vehicle 104 on the left (e.g., driver) or the right (e.g., passenger). If the trip report 214 and/or associated paired device records 216 identify two user computing devices 110 present on a trip, and occupant determination module 218 uses the processed sensor data to determine that one device 110 is associated with the left side of vehicle 104 and a second device 110 is associated with the right side of vehicle 104, occupant determination module 220 may record that the vehicle user associated with the first device 110 is the driver and the vehicle user of the second device 110 is a passenger for the trip. If more than one device 110 is associated with the left side of vehicle 104 (e.g., the driver's side), driver determination sub-module 221 may employ one or more other methods described herein to determine the driver of the vehicle.

In another embodiment, vehicle 104 may generate sensor data using one or more biometric sensors. Biometric sensors may include any sensor configured to receive a biological signal uniquely identifying an individual, such as, but not limited to, retinal scanners, fingerprint scanners, facial recognition devices, and weight scales. For example, vehicle 104 may have one or more fingerprint scanners on a component of the vehicle 104 only easily accessible by the driver, such as the dashboard, the console or the steering wheel. In another example, vehicle 104 may have a weight scale associated with the driver's seat and/or with the passenger's seats. Occupant determination module 220 may store a registered weight (or any other biometric marker) associated with each vehicle user. When any vehicle user sits in any of the seats, their weight may be measured by the scale and the particular vehicle user may be identified. Under instruction from VCA computing device 102 via the app, vehicle 104 may append to the trip report 214 an identification of each vehicle user within vehicle 104 and/or an identification of the position of each vehicle user within vehicle 104. Occupant determination module 220 may parse the trip report 214 for the identification of each vehicle user within vehicle 104 and associate those vehicle users with the trip. Driver determination sub-module 221 may parse the trip report 214 for the identification of which vehicle user was recorded in the driver position, and determine the driver for the trip to be that vehicle user.

In some embodiments, vehicle 104 may include a plurality of user-specific keys. When vehicle 104 is obtained by the set of vehicle users, each may receive a user-specific key fob (or other device), which is registered to or otherwise specifically associated with that specific vehicle user. The vehicle users may sign a contract or other agreement that each vehicle user will only use the key specific to his- or herself, which may encourage the vehicle users to carefully and consistently only use their specific key. Under the instruction of VCA computing device 102 via the app, vehicle 104 may record which user-specific key is used to unlock and/or start vehicle 104 and append an identification of that vehicle user and/or the user-specific key to the trip report 214. Driver determination sub-module 221 may parse the trip report 214 for the identification of the user-specific key and may determine that the associated vehicle user is the driver for that trip. Additionally or alternatively, vehicle 104 may include one or more sensors (e.g., one or more proximity sensors) configured to sense which user-specific key(s) is within the vehicle during the trip. If only one user-specific key is sensed, vehicle 104 may record which user-specific key was sensed, and append an identification of that vehicle user and/or the user-specific key to the trip report 214.

Moreover, in some embodiments, vehicle 104 and/or a user computing device 110 (e.g., a paired user computing device 110) may be configured to track driving characteristics of vehicle 104 and/or the driver of vehicle 104 during a trip. Additionally or alternatively, a separate computing device may be provided for use with the vehicle (e.g., may be "plugged in" or otherwise coupled to the vehicle) that tracks driving characteristics. Driver determination sub-module 221 may use any occupant-determination method(s) described herein to associate certain trips with specific vehicle users until driver determination sub-module 221 may automatically associate driving characteristics with particular vehicle users. For example, driver determination sub-module 221 may include machine learning functionality and may develop and maintain "driver profiles" for each of the vehicle users by using any above-described method to associate a vehicle user with particular driving characteristics. Driver determination sub-module 221 may then use the driver profiles to automatically identify which vehicle user is the driver in future trips (e.g., without using any or all of the above described driver determination methods).

When occupant determination module 220 makes an identification of any and/or all vehicle users present in vehicle 104 during a trip, occupant determination module 220 may append an identification of each of these vehicle users to the associated trip report 214. When driver determination sub-module 221 determines a driver for a trip, occupant determination module 220 may append an identification of the driver to the trip report 214. In some embodiments, when driver determination sub-module 221 is unable to determine which vehicle user is a driver, when more than one vehicle user is known to be in the vehicle during a trip, occupant determination module 220 may append a "driver unknown" indication with the trip report 214. In some embodiments, vehicle 104 includes an autonomous or self-driving vehicle 104. Under instruction from VCA computing device 102 via the app, for any trip in which no vehicle user is driving (e.g., an "autonomous trip"), vehicle 104 may append an indication to the associate trip report 214 that the trip is an autonomous trip. Occupant determination module 220 may additionally append a "no associated driver—autonomous trip" indication (or type or version of autonomous vehicle system software driving the vehicle) to trip report 214.

Based upon the determined vehicle users associated with the trip, vehicle usage analysis module 218 may determine certain vehicle costs attributable to a trip. For example, vehicle usage analysis module 218 may determine which vehicle users (i.e., the vehicle users associated with a trip) are associated with a particular incidental cost. As another example, vehicle usage analysis module 218 may be configured to determine insurance costs associated with the trip, based upon vehicle policies 210 as well as insurance information associated with each respective vehicle user. Vehicle usage analysis module 218 may transmit instructions to insurance server 112 (shown in FIG. 1) to communicate insurance rates and/or other insurance information (e.g., insurance policy information) to vehicle usage analysis module 218.

In some embodiments, wherein vehicle 104 includes an autonomous vehicle 104, this insurance information may include liability information describing which party maintains liability when the autonomous vehicle 104 is driving. For example, the manufacturer of the autonomous vehicle 104 may maintain liability during such "autonomous" trips. Vehicle usage analysis module 218 may use output from occupant determination module 220 to identify trip reports 214 associated with autonomous trips. Vehicle usage analysis module 218 may indicate that no insurance cost should be associated with such autonomous trips, in embodiments in which insurance costs are incurred on a per-trip basis.

Vehicle usage analysis module 218 generates and maintains a respective user usage report 212 associated with each vehicle user, based at least in part each trip report 214 associated with the corresponding vehicle user (e.g., based upon the output from occupant determination module 220). Each usage report 212 describes the cumulative amount, frequency, and/or type of usage of vehicle 104 by the respective vehicle user.

Cost allocation module 222 may be configured to use each usage report 212 to determine a respective vehicle user cost (i.e., a portion of the total vehicle cost for the interval of time) attributable to each vehicle user. Cost allocation module 222 may retrieve vehicle policies 210 and, based upon the content and directives thereof, divide the total vehicle cost amongst the vehicle users. Cost allocation module 222 may divide and allocate certain "sub-costs" differently, in accordance with vehicle policies 210. For example, cost allocation module 222 may be configured to divide a total asset cost associated with vehicle 104 during the interval of time evenly between all of the vehicle users.

Cost allocation module 222 may be configured to divide a total fuel and/or maintenance cost associated with vehicle 104 during the interval of time according to actual usage, based upon the respective usage reports 212. Cost allocation module 222 may be configured to determine a total insurance cost associated with usage of vehicle 104 over the interval of time, based upon usage reports 212 and/or insurance information received from insurance server 112.

In some cases, insurance costs may vary on a per-trip basis based upon a driver of each trip. In other cases, insurance costs may be fixed on a per-interval basis (e.g., $X/month), based upon an average risk level of all vehicle users. In other cases, insurance costs may be determined based upon usage of vehicle 104, and are accrued on a mileage- and/or time-driven basis (e.g., on a "pay-by-mile" basis). Cost allocation module 222 may be configured to determine an insurance cost associated with a particular trip based upon mileage driven and/or time driven on that particular trip. For example, cost allocation module 222 may retrieve a trip report 214 that identifies the driver of the trip and one or more characteristics of the trip, such as mileage driven and/or time driven. Cost allocation module 222 may process insurance information associated with the driver and/or vehicle 104 to determine the insurance cost associated with that particular trip according to an insurance rate included in the insurance information and the mileage driven and/or time driven.

In some embodiments, cost allocation module 222 is configured to receive information (e.g., from vehicle 104 and/or a user computing device 110) about a potential trip to be taken using vehicle 104. This "potential trip report" may include an identification of the driver for the trip, any vehicle user passengers anticipated on the trip, and an estimated mileage and/or trip to be driven. The estimated mileage and/or time may be manually entered by a user (e.g., "100 miles"). Additionally or alternatively, the potential trip report may include an anticipated destination for the potential trip. Cost allocation module 222 may determine the estimated mileage based upon a current location of vehicle 104 and/or the user computing device 110 and the anticipated location (e.g., using GPS coordinates, a mapping/direction service, and/or using any other method). Cost allocation module 222 may process the potential trip report and retrieve insurance information associated with the identified driver from insurance server 112, to report an anticipated insurance cost for the trip back to vehicle 104 and/or the user computing device 110. Cost allocation module 222 may determine and report other costs associated with the potential trip, such as a fuel cost and/or incidental costs (e.g., expected tolls), for example, by accessing data related thereto (e.g., current fuel rates near the location of vehicle 104 and/or along an anticipated route). Cost allocation module 222 may receive a response from vehicle 104 and/or the user computing device 110 including (i) an affirmative response, that the vehicle user(s) will be taking the potential trip; (ii) a negative response, that the vehicle user(s) will not be taking the potential trip; or (iii) an edit response, that includes one or more changes to the potential trip report. Cost allocation module 222 may allocate the determined costs to each vehicle user identified in the potential trip report and/or may place a "hold" on one or more financial accounts of the vehicle user(s) for the determined costs, as real trip costs may differ from pre-trip estimated costs.

Cost allocation module 222 may be configured to divide the total insurance cost based upon the insurance information, usage reports 212, and/or vehicle policies 210. Cost allocation module 222 may be configured to determine which trip reports 212 are associated with autonomous trips, in which insurance costs may vary and/or be eliminated (for the vehicle users) and may adjust a total insurance cost and/or a respective user portion of the total insurance cost accordingly. For example, cost allocation module 222 may remove an insurance cost portion for each vehicle user associated with an autonomous trip.

Cost allocation module 222 may be further configured to allocate each respective vehicle user cost to the corresponding vehicle user. Each vehicle user cost may include an aggregate of the vehicle user's portions of each "sub-cost," for example, a total amount including a portion of the total insurance cost, a portion of the total asset cost, a portion of the total fuel cost, etc. Additionally or alternatively, each vehicle user cost may include an itemized breakdown on a per-"sub-cost", per trip, and/or usage percentage (of the total) basis.

Payment management module 224 may be configured to manage payments of each vehicle user cost, in accordance with one or more vehicle policies 210 and/or in accordance with the wishes of the vehicle users. The functionality of payment management module 224 is described further herein with respect to FIG. 4.

In some embodiments, display device 204 may be configured to facilitate display of up-to-date trip reports 214, usage reports 212, and/or costs for each vehicle user. For example, display device 204 may be configured to display a "dashboard" within the app (e.g., on a user interface of vehicle 104 and/or user computing device 110). Each vehicle user may "log-in" to the app to have displayed their own personal trip, usage, and/or costs data. Moreover, in some embodiments, display device 204 may be configured to display bills, reminders, notifications, and/or other information to each vehicle user within the app.

Exemplary Vehicle

Figure 3:
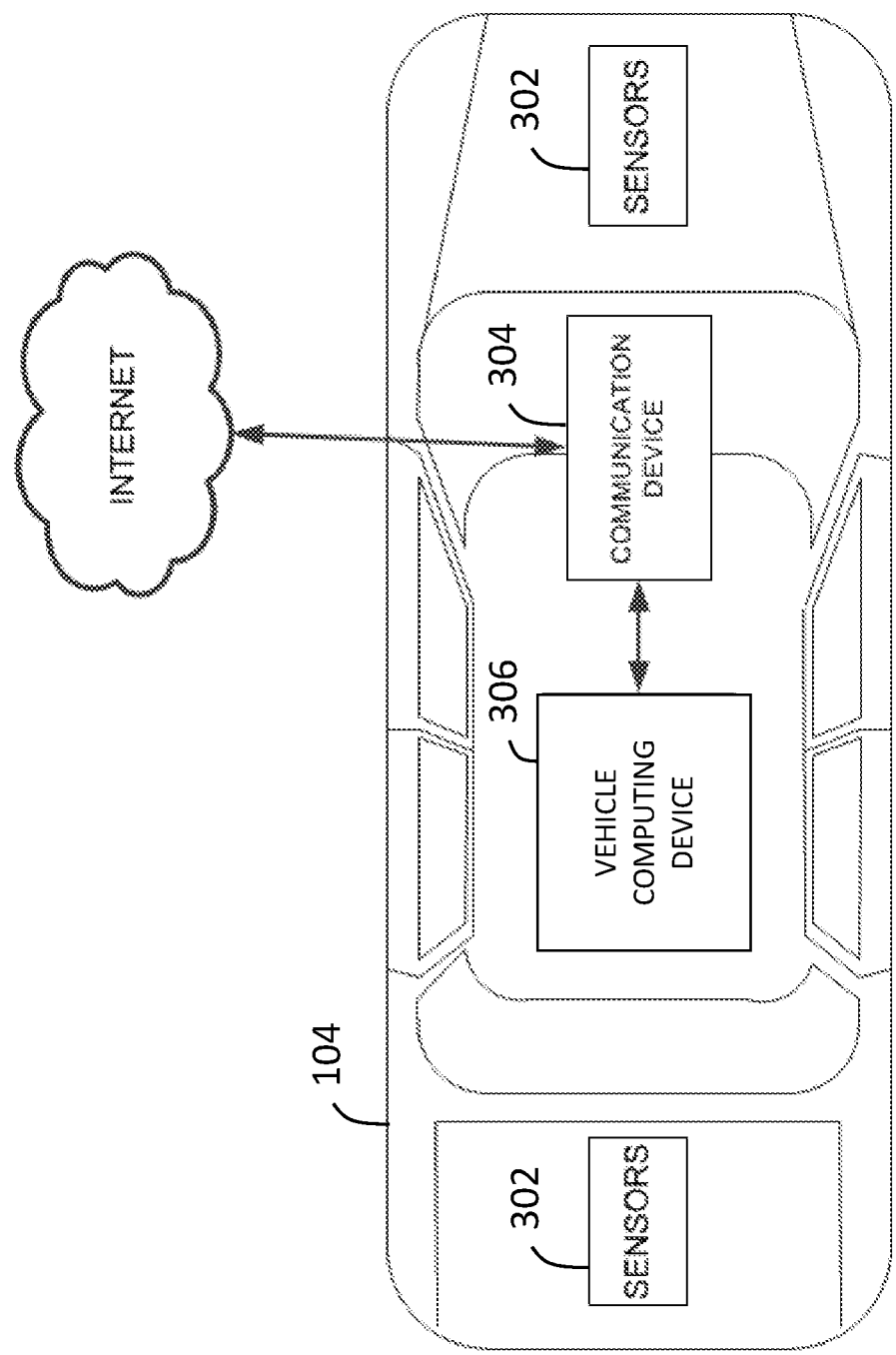
FIG. 3 illustrates a schematic diagram of an exemplary vehicle that may be used in the shared vehicle system shown in FIG. 1.

FIG. 3 depicts a view of an exemplary vehicle 104 (shown in FIG. 1). Although vehicle 104 is illustrated as a car, it should be understood that vehicle 104 may include any other kind of vehicle, such as, but not limited to, trucks, motorcycles, boats, planes, RVs, etc.

Vehicle 104 includes a plurality of sensors 302, a communication device 304, and a vehicle computing device 306. The plurality of sensors 302 may include, for example, biometric sensors, proximity-based sensors (e.g., for tracking paired/registered keys, key fobs, paired user computing devices 110, etc.), driving characteristic sensors (e.g., accelerometers, gyroscopes, GPS devices, etc.) or telematics data collection devices, and/or any other kind of sensor. Vehicle computing device 306 is configured to collect sensor data from sensors 302. In some embodiments, vehicle computing device 306 may process, store, and/or transmit sensor data, including as described herein.

Vehicle computing device 306 may be any computing device capable of performing the functions described herein. Vehicle computing device 306 may be integral to vehicle 104 (e.g., a console computing device) and/or may be coupled to vehicle 104 (e.g., an after-market or retro-fit computing device). Moreover, it is contemplated that in some embodiments, vehicle computing device 306 may include VCA computing device 102 (shown in FIG. 1), such that the functionality of VCA computing device 102 may be performed at vehicle 104. Vehicle computing device 306 may be communicatively coupled to the Internet through communication device 304. Additionally, vehicle computing device 306 may communicate with VCA computing device 102 and/or user computing device(s) 110 using communication device 304. Communication device 304 may include, for example, a wired or wireless network adapter and/or a wireless data transceiver for use with a mobile telecommunications network. Communication device 304 may be configured to communication using many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, a cable modem, a Wi-Fi connection, and a Bluetooth® connection.

In one embodiment, vehicle 104 includes a self-driving vehicle 104. Self-driving vehicle 104 may be an autonomous vehicle capable of fulfilling the transportation capabilities of a traditional automobile or other vehicle. Self-driving vehicle 104 may be capable of sensing its environment and navigating without human input. Self-driving vehicle 104 may perform all safety-critical functions for the entire trip, with the driver not expected to control the vehicle at any time. As this self-driving vehicle 104 would control all functions from start to stop, including all parking functions, it may include unoccupied vehicles.

The plurality of sensors 302 in self-driving vehicle 104 may detect the current surroundings and location of self-driving vehicle 104. The plurality of sensors 302 may further include, but are not limited to, radar, LIDAR, Global Positioning System (GPS), and computer vision. Vehicle computing device 306 may interpret the sensory information to identify appropriate navigation paths, as well as obstacles and relevant signage. In some embodiments, vehicle computing device 306 may update maps based upon sensory input, allowing vehicle computing device 306 to keep track of self-driving vehicle's 104 position, even when conditions change or when self-driving vehicle 104 enters uncharted environments. Additionally, vehicle computing device 306 may control the direction and speed of self-driving vehicle 104. Vehicle computing device 306 may allow self-driving vehicle 104 to travel from point A to point B without input from a human operator (e.g., a vehicle user). In the exemplary embodiment, vehicle computing device 306 may direct self-driving vehicle 104 with a human occupant (e.g., a vehicle user and/or a vehicle non-user) in self-driving vehicle 104.

Exemplary Payment Management

Figure 4:
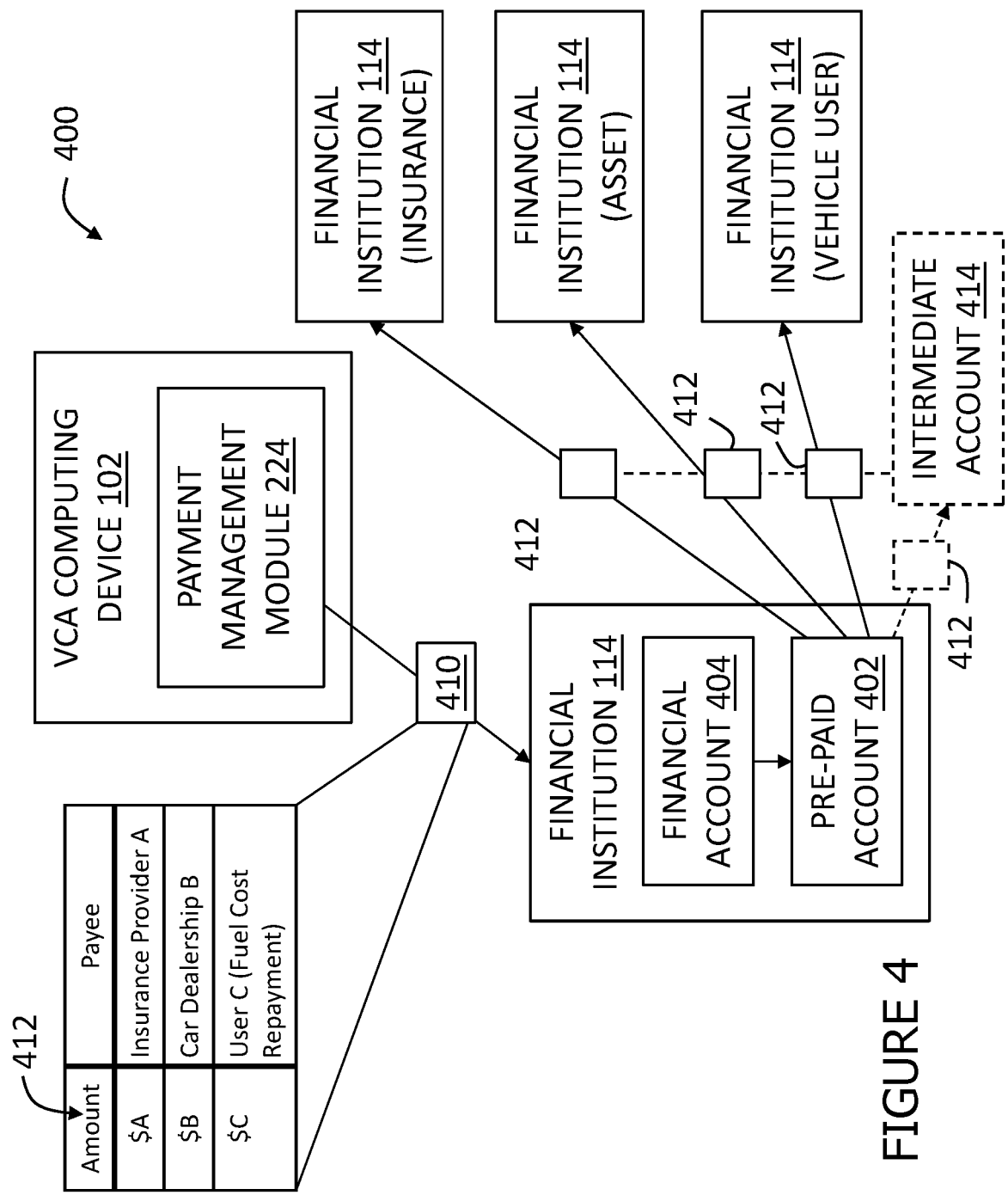
FIG. 4 illustrates a data flow diagram showing exemplary payment management functionality of the VCA computing device shown in FIG. 2.

FIG. 4 illustrates a data flow diagram 400 showing exemplary functionality of VCA computing device 102 (shown in FIGS. 1 and 2). More specifically, FIG. 4 illustrates exemplary payment management functionality of payment management module 224 (shown in FIG. 2) of VCA computing device 102. It should be understood that the functionality described herein is illustrative only and should not be construed to limit the present disclosure.

In one exemplary embodiment, vehicle 104 (shown in FIG. 1) has a plurality of vehicle costs associated therewith, as described herein. Each vehicle cost may be paid to a different payee party. For example, in one embodiment, such payee parties may include, without limitation, an insurance provider (e.g., payee for an insurance cost), a car dealership (e.g., payee for an asset cost), a repair shop (e.g., payee for a maintenance cost), and/or another vehicle user (e.g., a vehicle user who paid a fuel cost upfront and is to be reimbursed by the other vehicle users). Payee parties may maintain respective financial accounts at financial institutions 114 (shown in FIG. 1). Accordingly, in FIG. 4, three payee parties are represented by their respective financial institutions 114.

In some embodiments, each payee party issues one bill covering the entirety of the vehicle cost associated with that party. For example, a repair shop may issue a single bill for $80 for an oil change. VCA computing device 102, as described above with respect to FIG. 2, determines what portion of this $80 is attributable to each vehicle user. Payment management module 224 may then issue a "pseudo-bill" to each vehicle user, the pseudo-bill indicating the respective portion of the $80 that must be paid by each vehicle user.

In one embodiment, each vehicle user may independently make a payment to the payee party. Continuing with the above example, each vehicle user may independently make a payment to the repair shop in an amount corresponding to their portion of the $80 charge. In another embodiment, each vehicle user may pay one "representative" vehicle user, who will then make one "lump" payment to the payee party.

In some embodiments, VCA computing device 102 automatically handles payment of the payee party, in accordance with one or more vehicle policies 210 (shown in FIG. 2) and/or other instructions given by each vehicle user. In some cases, one or some of a plurality of vehicle users may choose to use the payment management functionality of VCA computing device 102. In other cases, all of a plurality of vehicle users may choose to use the payment management functionality of VCA computing device 102.

In one embodiment, payment may be rendered by each vehicle user on a prepayment schedule (e.g., whether payment is automatically managed using payment management module 224 or manually by each vehicle user). In other words, payment for a particular interval (e.g., one month) may be rendered prior to that interval (e.g., during the preceding month). However, this may pose some challenge for groups of vehicle users with vehicle policies 210 that divide one or more vehicle costs based upon actual usage.

In some embodiments, an equal division of all costs may be allocated for pre-payment for a number of "preliminary" intervals (e.g., the first three months of the cost-sharing structure implemented by the vehicle users as set out in vehicle polices 210). During these preliminary intervals, each vehicle user may pay equal portions of the vehicle costs but actual usage may be tracked and recorded, as described herein. VCA computing device 102 may develop "average usage reports" (which may include and/or be similar to usage reports 212, shown in FIG. 2) for each individual vehicle user, for each vehicle policy and/or cost category (e.g., average fuel use for each vehicle user, average number of trips as a driver, etc.).

For the first interval after the preliminary intervals, portions of the vehicle costs may be allocated to each vehicle user according to their respective average usage report and vehicle policies 210. Actual usage may be continually tracked, and average usage reports may be continually updated, such that the pre-payment for each interval is a reflection of past actual usage. Each usage report may incorporate usage data maintained for an indefinite period of time. Alternatively, each usage report may incorporate usage data maintained for a particular number of past intervals (e.g., the past six months, the past twelve months, etc.). Additionally or alternatively, each usage report may permit "resetting" of the data incorporated therein, in accordance with certain events (e.g., moving, changing job locations, etc.), such that the usage report may more quickly respond to large changes in actual usage.

In another embodiment, payment may be rendered on a post-payment schedule directly in accordance with actual usage. Payment may be rendered at regular intervals (e.g., every week, every two weeks, every month, etc.) in accordance with vehicle user preference and/or as required by a particular payee party. VCA computing device 102 may allocate payment amounts based upon determined and/or tracked actual usage in accordance with vehicle policies 210. In some embodiments, payment management module 224 (and/or vehicle users) may initiate payments to be made (as described herein) in a typical "receive bill for bill amount, pay bill in bill amount with payment account" fashion, at these regular intervals.

Additionally or alternatively, payment management module 224 (and/or vehicle users) may initiate payments to be made on a rolling basis (e.g., after every trip, each day, etc.).

In one exemplary embodiment, payment management module 224 receives (e.g., from cost allocation module 222, shown in FIG. 2) an indication of the respective portions of vehicle costs allocated to (i.e., to be paid by) each vehicle user. Payment management module 224 may access financial account information associated with each vehicle user. Financial account information may be stored (e.g., in memory 108, shown in FIG. 1) in an encrypted and/or anonymized fashion. Payment management module 224 may then access a financial account for each vehicle user.

In one embodiment, each vehicle user maintains a pre-paid account 402 associated specifically with shared vehicle system 100. In some embodiments, this pre-paid account 402 is maintained at the same financial institution 114 as one or more other financial accounts 404 of the vehicle user (e.g., a savings account or checking account). The vehicle user may use financial account 404 to pre-fund pre-paid account 402 with money (whether or not financial account 404 is maintained at the same financial institution 114 as pre-paid account 402). The vehicle user may ensure funds are present in pre-paid account 402, such that payments may be made automatically (e.g., without requesting a specific amount be transferred to pre-paid account 402 before the payment can be made). In some embodiments, payment management module 224 may withdraw payments from pre-paid account 402 in accordance with the portion of each vehicle cost owed by the vehicle user. Pre-paid account 402 may have an alert functionality configured to alert the associated vehicle user when a balance of pre-paid account 402 falls below a particular threshold amount (e.g., $50 or $20), to avoid a zero or negative balanced of pre-paid account 402. It should be understood that, in some cases, pre-paid account 402 and financial account 404 may be the same account. In such cases, payments may be made in a typical "automatic bill" fashion, when initiated by payment management module 224 as described herein.

To initiate a payment, payment management module 224 transmits payment instructions 410 to the financial institution 114 at which pre-paid account 402 (and/or any other financial account 404 from which a vehicle user makes payments) is maintained. Payment instructions 410 include one or more payment amounts 412, and cause financial institution 114 to automatically withdraw funds in the payment amount(s) from pre-paid account 402. In some embodiments, payment instructions 410 (as shown in FIG. 4) include a plurality of payment amounts 412, as well as a corresponding plurality of payee parties (e.g., financial accounts details thereof) to which the payment amounts 412 are due. In these embodiments, payment instructions 410 cause financial institution 114 to automatically initiate transfer of funds each payment amount 412 to the corresponding financial institution 114 associated with the payee party to which the payment amount 412 is due.

In another embodiment, to avoid making a plurality of transfers for the payment of a single bill from a payee party, payment management module 224 may include in payment instructions 410 the financial account information of an intermediate account 414. Intermediate account 414 may be associated with VCA computing device 102 and/or shared vehicle system 100. In these embodiments, payment instructions 410 may cause financial institution 114 to automatically transfer funds in each payment amount 412 to intermediate account 414 (e.g., in separate transfers or as a sum of all individual payment amounts 412). Once funds have been transferred to intermediate account 414 from every pre-paid account 402 associated with each vehicle user, such that intermediate account 414 includes funds in a total bill amount due to a payee party, payment management module 224 initiates a transfer of funds from intermediate account 414 to the financial institution 114 of the payee party (e.g., with another set of payment instruction 410).

In some cases, funds may be transferred between pre-paid accounts 402 of vehicle users associated with the same vehicle. For example, if one vehicle user "pre-paid" fuel costs for all vehicle users of a group by paying for gas at a gas pump (e.g., paying $40.00 from their pre-paid account and/or any other account), payment management module 224 may be configured to transfer funds associated with the other vehicle users' respective fuel costs to the pre-paid account 402 of that vehicle user. In some embodiments, for situations like these and/or for other payments situations (e.g., for maintenance costs, tolls, parking fees, etc.), one or more of the vehicle users may maintain a joint account (e.g., a pre-paid account 402 and/or any other financial account 404) from which total bill amounts may be withdrawn.

Exemplary User Computer Device

Figure 5:
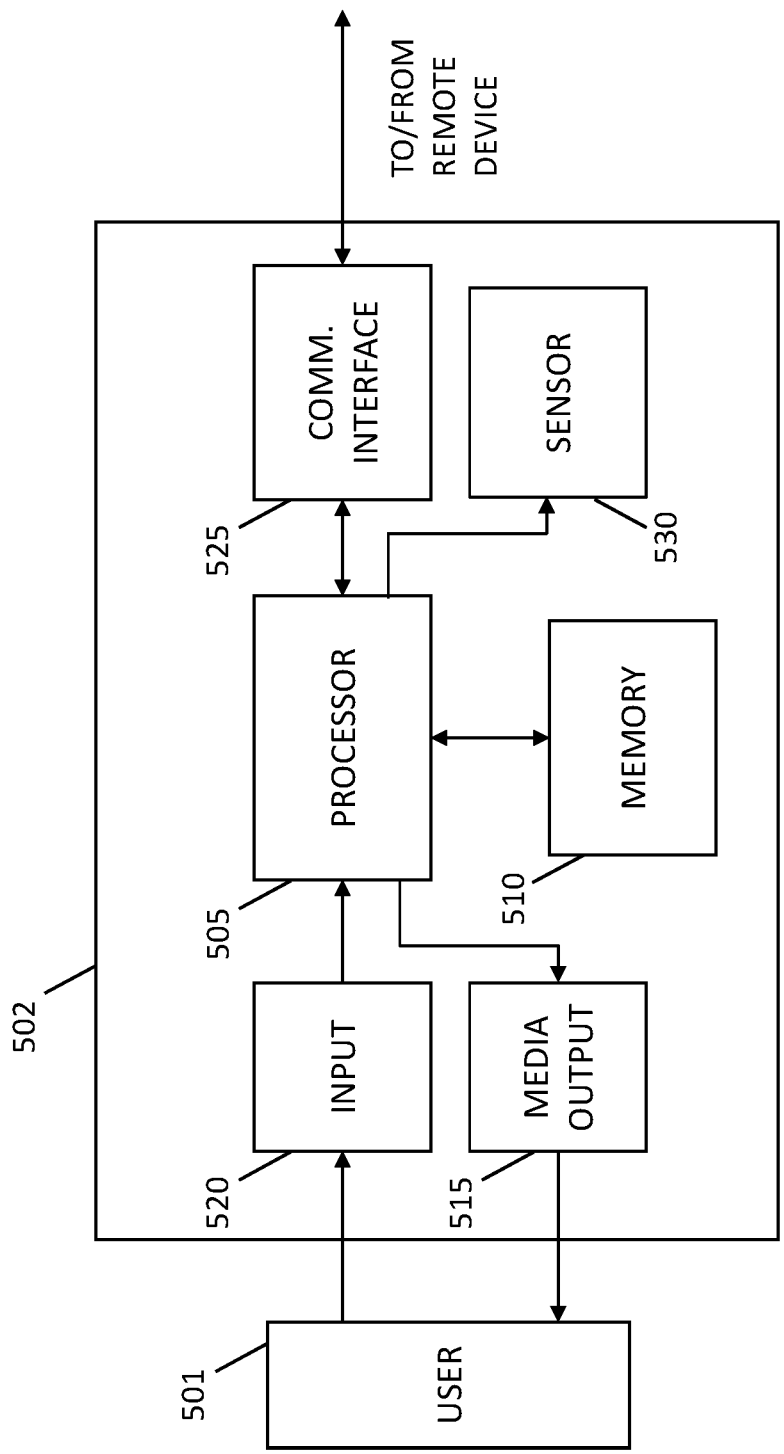
FIG. 5 illustrates an exemplary configuration of an exemplary user computing device shown in FIG. 1, in accordance with one embodiment of the present disclosure.

FIG. 5 depicts an exemplary configuration of an exemplary user computer device 502 that may be used with shared vehicle system 100 (shown in FIG. 1), in accordance with one embodiment of the present disclosure. User computer device 502 may be operated by a user 501 (e.g., a vehicle user). User computer device 502 may include, but is not limited to, user computing devices 110 (shown in FIG. 1). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer-readable media.

User computer device 502 also may include at least one media output component 515 for presenting information to user 501. Media output component 515 may be any component capable of conveying information to user 501. In some embodiments, media output component 515 may include an output adapter (not shown), such as a video adapter and/or an audio adapter. An output adapter may be operatively coupled to processor 505 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information.

In some embodiments, user computer device 502 may include an input device 520 for receiving input from user 501. User 501 may use input device 520 to, without limitation, interact with vehicle 104 and/or VCA computing device 102 (e.g., using an app), input trip information, and/or request payment information. Input device 520 may include, for example, a keyboard, a pointing device, a mouse, a stylus, and/or a touch sensitive panel (e.g., a touch pad or a touch screen). A single component such as a touch screen may function as both an output device of media output component 515 and input device 520. User computer device 502 further includes at least one sensor 530, including, for example, a gyroscope, an accelerometer, a position detector, a biometric input device, a telematics data collection device, and/or an audio input device.

User computer device 502 may also include a communication interface 525, communicatively coupled to a remote device such as VCA computing device 102 (shown in FIG. 1) and/or vehicle computing device 306 (shown in FIG. 3). Communication interface 525 may include, for example, a wired or wireless network adapter and/or a wireless data transceiver for use with a mobile telecommunications network.

Stored in memory area 510 may be, for example, computer-readable instructions for providing a user interface to user 501 via media output component 515 and, optionally, receiving and processing input from input device 520. The user interface may include, among other possibilities, a web browser and/or a client application. Web browsers enable users, such as user 501, to display and interact with media and other information typically embedded on a web page or a website from VCA computing device 102 and/or vehicle computing device 306. A client application may allow user 501 to interact with, for example, VCA computing device 102 and/or vehicle computing device 306. For example, instructions may be stored by a cloud service and the output of the execution of the instructions sent to the media output component 515.

Exemplary Server Device

Figure 6:
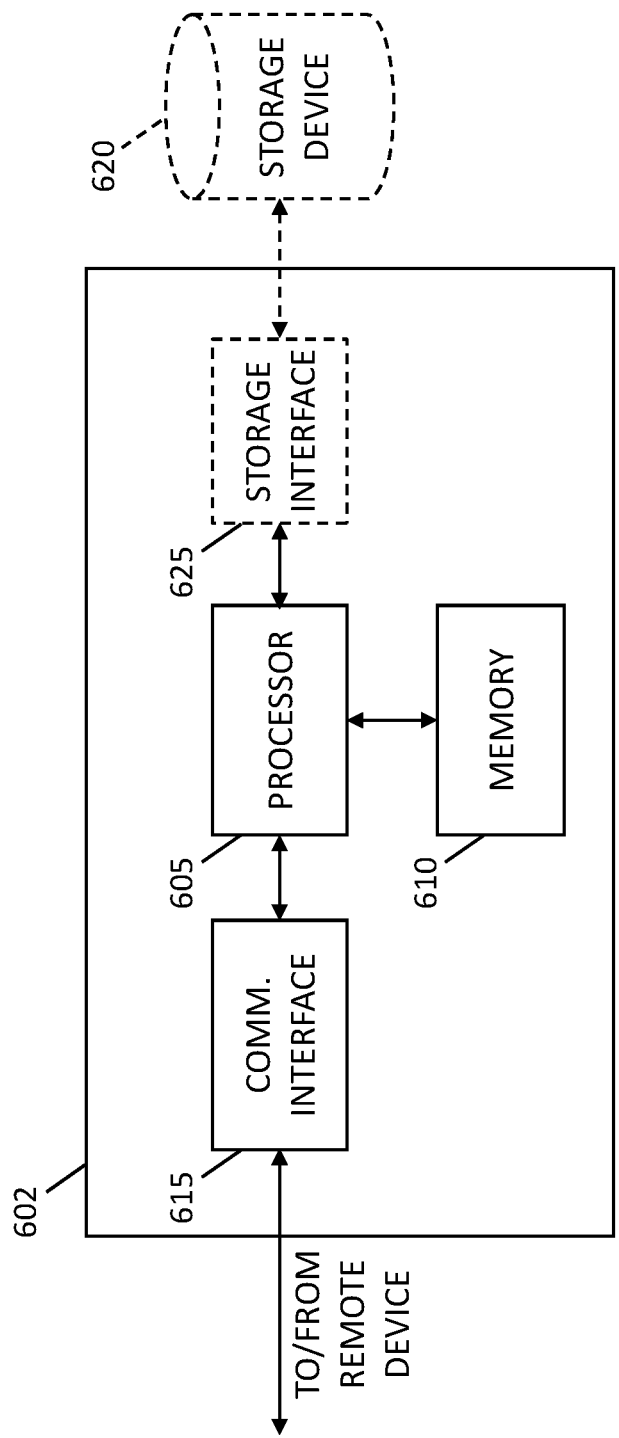
FIG. 6 illustrates an exemplary configuration of an exemplary server computer device shown in FIG. 1, in accordance with one embodiment of the present disclosure.

FIG. 6 depicts an exemplary configuration of an exemplary server computer device shown in FIG. 1, in accordance with one embodiment of the present disclosure. A server computer device 602 may include, but is not limited to, database server 106, VCA computing device 102, insurance server 112, (all shown in FIG. 1) and/or vehicle computing device 306 (shown in FIG. 3). Server computer device 602 may include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 602 may be capable of communicating with a remote device such as another server computer device 602, user computer device 502 (shown in FIG. 5), or VCA computing device 102. For example, communication interface 615 may receive requests from or transmit requests to user computer device 502 via the Internet.

Processor 605 may also be operatively coupled to a storage device 620. Storage device 620 may be any computer-operated hardware suitable for storing and/or retrieving data, such as, but not limited to, data associated with database 108 (shown in FIG. 1). In some embodiments, storage device 620 may be integrated in server computer device 602. For example, server computer device 602 may include one or more hard disk drives as storage device 620. In other embodiments, storage device 620 may be external to server computer device 602 and may be accessed by a plurality of server computer devices 6. For example, storage device 620 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 620 via a storage interface 625. Storage interface 625 may be any component capable of providing processor 605 with access to storage device 620. Storage interface 625 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 620.

Processor 605 executes computer-executable instructions for implementing aspects of the disclosure. In some embodiments, processor 605 may be transformed into a special purpose microprocessor by executing computer-executable instructions or by otherwise being programmed. For example, processor 605 may be programmed with the instructions such as are illustrated in FIG. 7.

Figure 7:
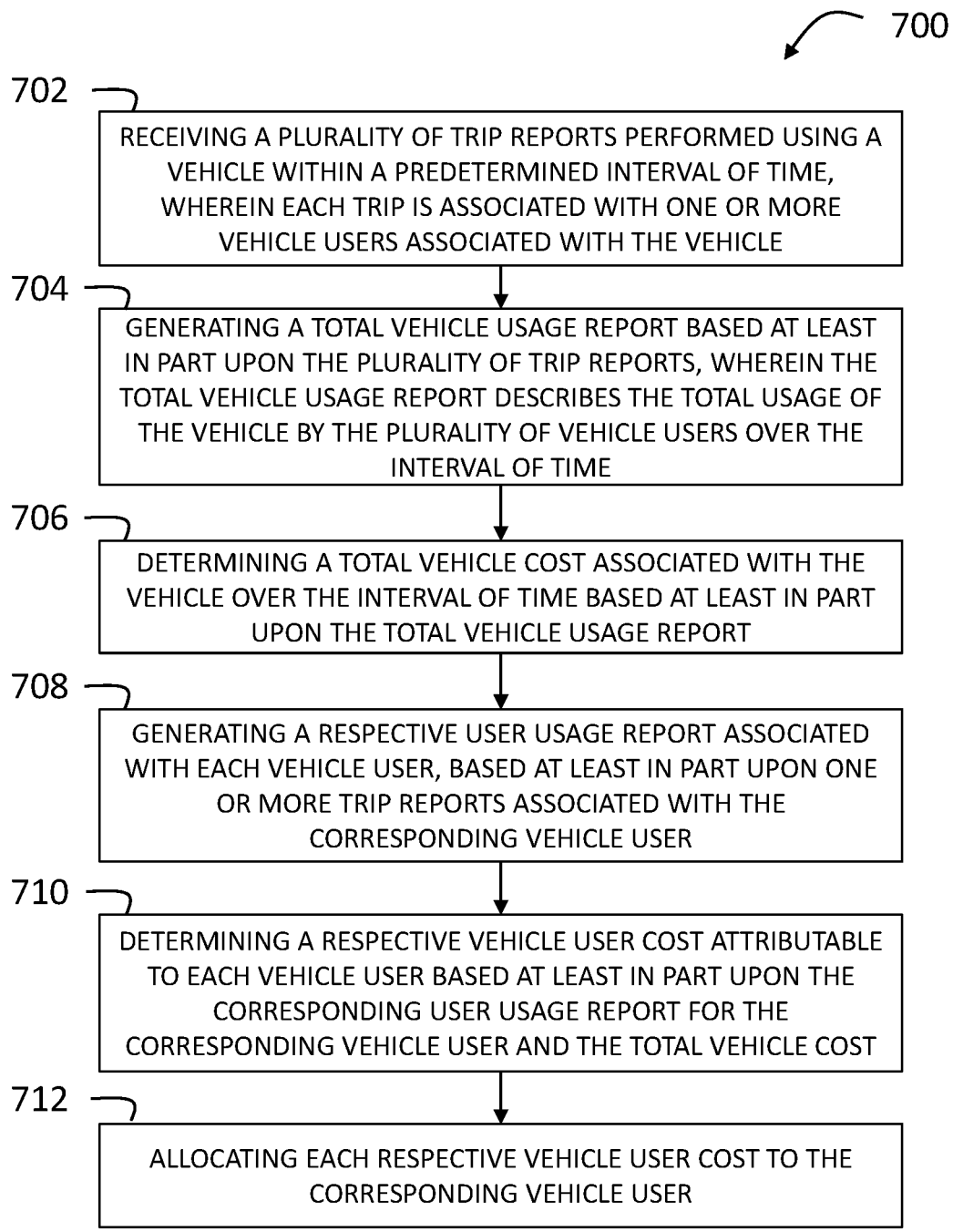
FIG. 7 illustrates a flow chart of an exemplary computer-implemented method for allocating vehicle costs between users of a vehicle, using the shared vehicle system shown in FIG. 1.

Exemplary Computer-Implemented Method for Allocating Vehicle Costs Between Users of a Vehicle FIG. 7 depicts a flow chart of an exemplary computer-implemented method 700 for allocating vehicle costs between users of a vehicle using shared vehicle system 100 shown in FIG. 1. In the exemplary embodiment, method 700 may be performed by VCA computing device 102 (shown in FIG. 1).

Method 700 may include receiving 702 a plurality of trip reports associated with a corresponding plurality of trips performed using a vehicle within a predetermined interval of time. Each trip of the plurality of trips is associated with one or more vehicle users of a plurality of vehicle users associated with the vehicle. Method 700 may further include generating 704 a total vehicle usage report based at least in part upon the plurality of trip reports. The total vehicle usage report describes the total usage of the vehicle by the plurality of vehicle users over the interval of time. Method 700 may also include determining 706 a total vehicle cost associated with the vehicle over the interval of time based at least in part upon the total vehicle usage report.

Method 700 may still further include generating 708 a respective user usage report associated with each vehicle user of the plurality of vehicle users, based at least in part upon one or more trip reports of the plurality of trip reports associated with the corresponding vehicle user. Method 700 may also include determining 710 a respective vehicle user cost (e.g., portion of the total vehicle cost) attributable to each vehicle user of the plurality of vehicle users based at least in part upon the corresponding user usage report for the corresponding vehicle user and the total vehicle cost. Method 700 may further include allocating 712 each respective vehicle user cost to the corresponding vehicle user.

Figure 8:
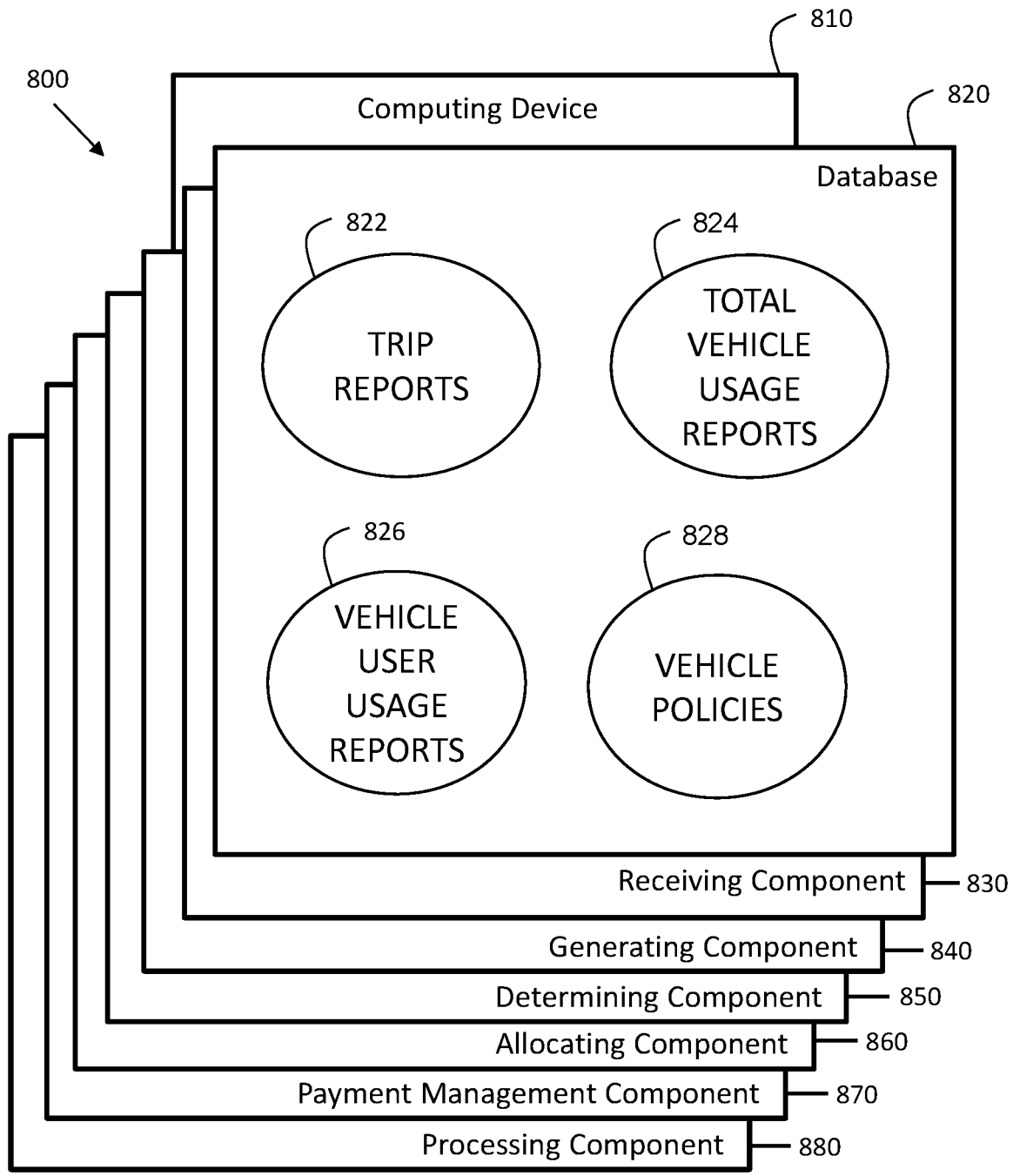
FIG. 8 illustrates a diagram of components of one or more exemplary computing devices that may be used in the shared vehicle system shown in FIG. 1.

Exemplary Computer Device for Allocating Vehicle Costs Between Users of a Vehicle FIG. 8 depicts a diagram 800 of components of one or more exemplary computing devices 810 that may be used in shared vehicle system 100 shown in FIG. 1. In some embodiments, computing device 810 may be similar to VCA computing device 102 (shown in FIG. 1). In the exemplary embodiment, computing device 810 may include a database 820, which may be similar to database 108 (shown in FIG. 1). Database 820 may include trip reports 822, total vehicle usage reports 824, user usage reports 826, and vehicle policies 828. Database 820 may be coupled with several separate components within computing device 810, which perform specific tasks.

In one exemplary embodiment, computing device 810 may include a receiving component 830. In some embodiments, receiving component 830 may include and/or be integral to any kind of communication device (e.g., a transceiver). Receiving component 830 may be configured to receive a plurality of trip reports 822 associated with a corresponding plurality of trips performed using a vehicle within a predetermined interval of time. Each trip of the plurality of trips may be associated with one or more vehicle users of a plurality of vehicle users associated with the vehicle.

Computing device 810 may also include a generating component 840. Generating component 840 may be configured to generate a total vehicle usage report 824 based at least in part upon the plurality of trip reports 822. The total vehicle usage report 824 may describe the total usage of the vehicle by the plurality of vehicle users over the interval of time. Generating component 840 may also be configured to generate a respective user usage report 826 associated with each vehicle user of the plurality of vehicle users, based at least in part upon one or more trip reports 822 of the plurality of trip reports 822 associated with the corresponding vehicle user.

Computing device 810 may further include a determining component 850. Determining component 850 may be configured to determine a total vehicle cost associated with the vehicle over the interval of time based at least in part upon the total vehicle usage report 824. Determining component 850 may be further configured to determine a respective vehicle user cost attributable to each vehicle user of the plurality of vehicle users based at least in part upon the corresponding user usage report 826 for the corresponding vehicle user and the total vehicle cost.

Computing device 810 may also include an allocating component 860, configured to allocate each respective vehicle user cost to the corresponding vehicle user. Allocating may include, for example, recording the respective vehicle user cost and/or transmitting a message including the respective vehicle user cost to the corresponding vehicle user (e.g., to a user computing device associated with the vehicle user). Computing device 810 may further include, in some embodiments, a payment management component 870. Payment management component 870 may be configured to manage payments of the vehicle user cost(s) to respective payee parties (e.g., an insurance company, a car dealership, a repair shop, a financial institution, etc.).

Managing payments may include transmitting the message including the respective vehicle user cost, as well as portions of the respective vehicle cost payable to each payee party, such that the vehicle user may pay the payee party. Managing payments may additionally or alternatively include transmitting withdrawal and transfer instructions to one or more financial institutions associated with the vehicle user to cause payment of the vehicle user costs from a payment account of each vehicle user. Additionally, a processing component 880 may assist with execution of computer-executable instructions associated with the system.

Figure 9:
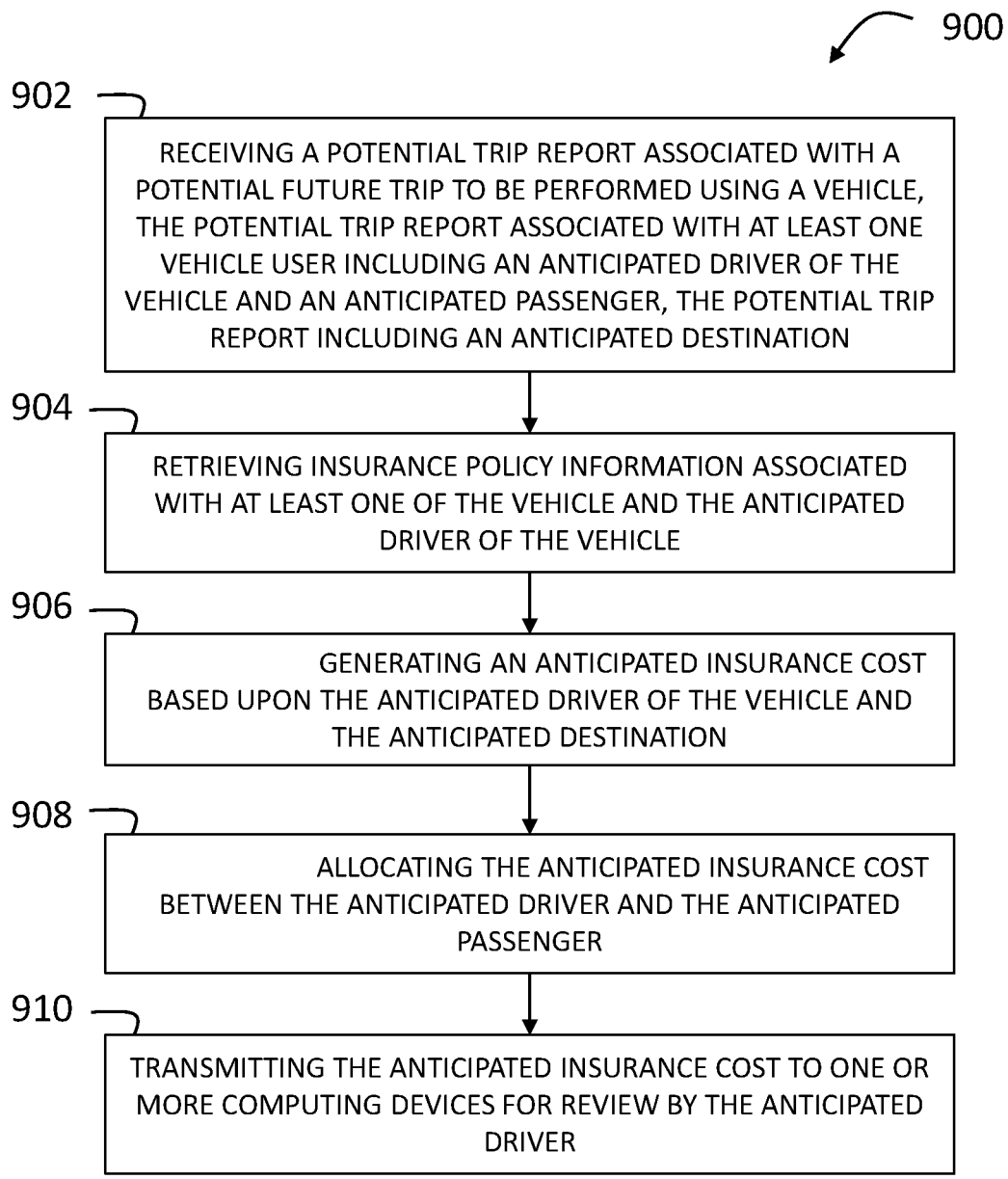
FIG. 9 illustrates a flow chart of another exemplary computer-implemented method for allocating vehicle costs between users of a vehicle, using the shared vehicle system shown in FIG. 1.

Additional Exemplary Computer-Implemented Methods for Allocating Vehicle Costs Between Users of a Vehicle FIG. 9 illustrates a flow chart of another exemplary computer-implemented method 900 for allocating vehicle costs between users of a vehicle, using the shared vehicle system 100 shown in FIG. 1. In the exemplary embodiment, method 900 may be performed by VCA computing device 102 (shown in FIG. 1).

Method 900 may include receiving 902 a potential trip report associated with a potential future trip to be performed using a vehicle. The potential trip report may be associated with at least one vehicle user including an anticipated driver of the vehicle and an anticipated passenger, and may include an anticipated destination. Method 900 may also include retrieving 904 insurance policy information associated with at least one of the vehicle and the anticipated driver of the vehicle.

Method 900 may also include generating 906 an anticipated insurance cost based upon the anticipated driver of the vehicle and the anticipated destination, and allocating 908 the anticipated insurance cost between the anticipated driver and the anticipated passenger. Method 900 may further include transmitting 910 the anticipated insurance cost to one or more computing devices for review by the anticipated driver.

Figure 10:
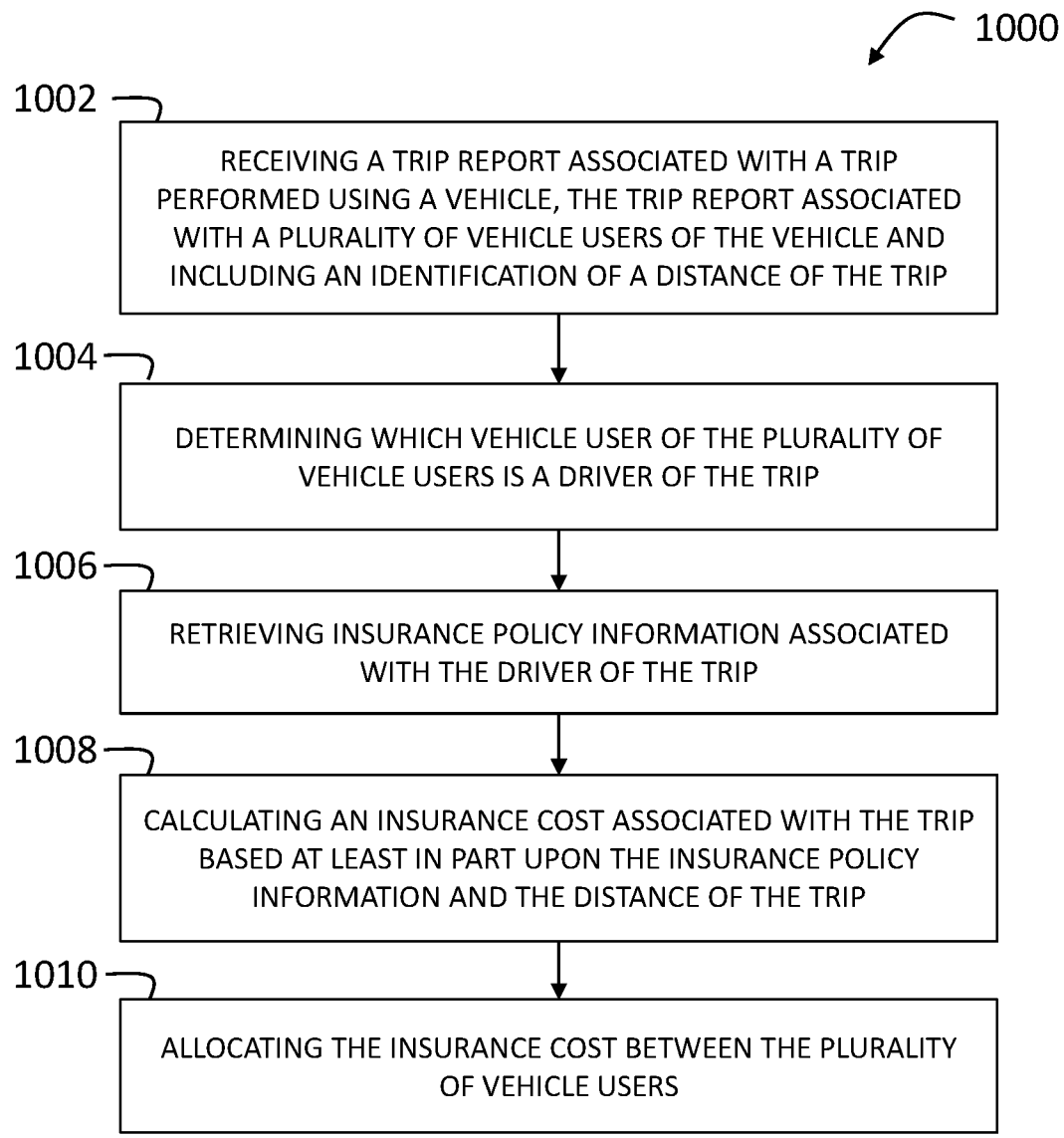
FIG. 10 illustrates a flow chart of yet another exemplary computer-implemented method for allocating vehicle costs between users of a vehicle, using the shared vehicle system shown in FIG. 1.

FIG. 10 illustrates a flow chart of yet another exemplary computer-implemented method 1000 for allocating vehicle costs between users of a vehicle, using the shared vehicle system 100 shown in FIG. 1. In the exemplary embodiment, method 1000 may be performed by VCA computing device 102 (shown in FIG. 1).

Method 1000 may include receiving 1002 a trip report associated with a trip performed using a vehicle. The trip report may be associated with a plurality of vehicle users of the vehicle, and may include an identification of a distance of the trip. Method 1000 may also include determining 1004 which vehicle user of the plurality of vehicle users is a driver of the trip, and retrieving 1006 insurance policy information associated with the driver of the trip.

Method 1000 may further include calculating 1008 an insurance cost associated with the trip based at least in part upon the insurance policy information and the distance of the trip, and allocating 1010 the insurance cost between the plurality of vehicle users.

Exemplary Autonomous or Semi-Autonomous Vehicle Functionality

Figure 11:
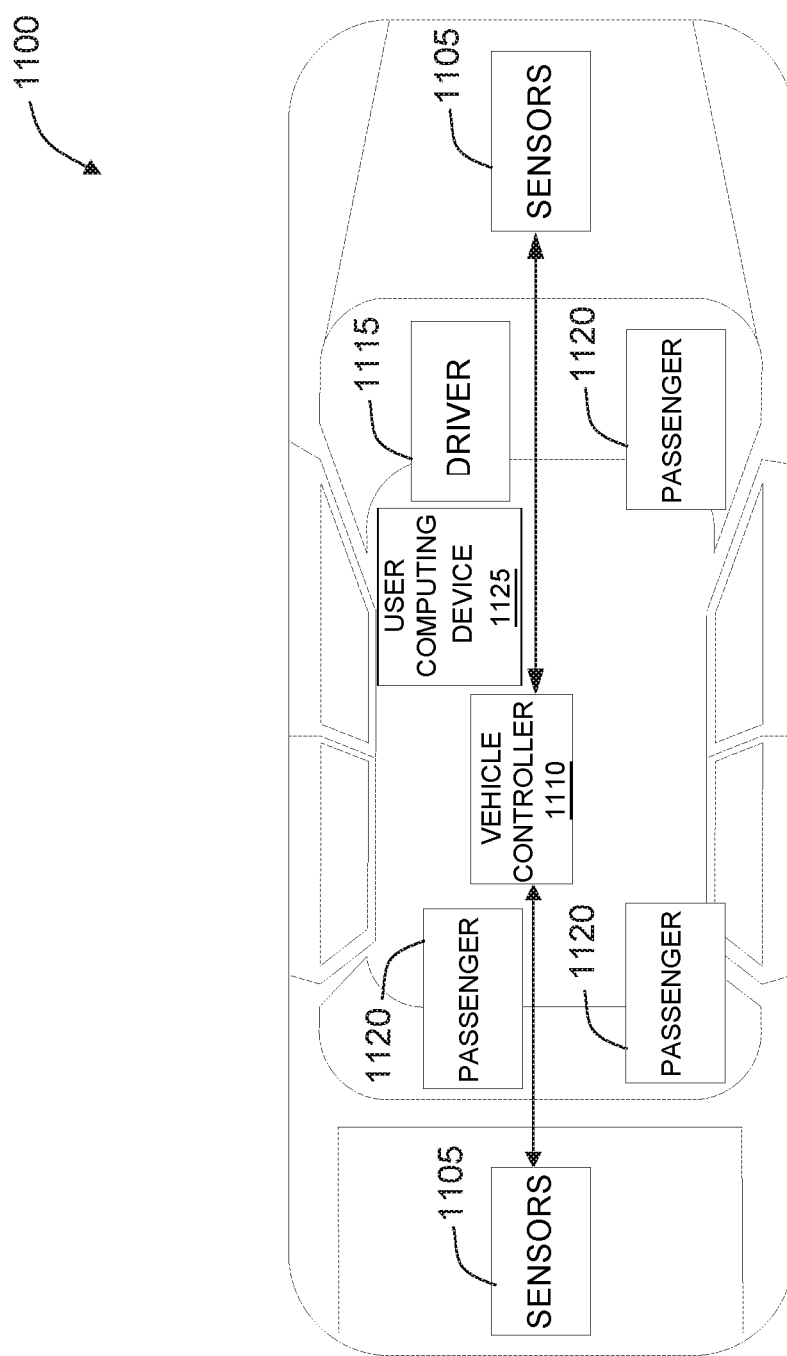
FIG. 11 illustrates a schematic diagram of an exemplary autonomous or semi-autonomous vehicle that may be used in the shared vehicle system shown in FIG. 1.

FIG. 11 depicts a view of an exemplary vehicle 1100. In the exemplary embodiment, vehicle 1100 may be an autonomous or semi-autonomous vehicle capable of fulfilling the transportation capabilities of a traditional automobile or other vehicle. In these embodiments, vehicle 1100 may be capable of sensing its environment and navigating without human input. In other embodiments, vehicle 1100 is a manual vehicle, such as a traditional automobile that is controlled by a driver 1115, and may be similar to vehicle 104 shown in FIGS. 1 and 3.

Vehicle 1100 may include a plurality of sensors 1105 and a vehicle controller 1110 (which may include and/or be similar to vehicle computing device 306, shown in FIG. 3). The plurality of sensors 1105 may detect the current surroundings and location of vehicle 1100. Plurality of sensors 1105 may include, but are not limited to, radar, LIDAR, Global Positioning System (GPS), video devices, imaging devices, cameras, audio recorders, and computer vision. Plurality of sensors 1105 may also include sensors that detect conditions of vehicle 1100, such as speed, acceleration, gear, braking, and other conditions related to the operation of vehicle 1100, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. Furthermore, plurality of sensors 1105 may include impact sensors that detect impacts to vehicle 1100, including force and direction, and sensors that detect actions of vehicle 1100, such the deployment of airbags. In some embodiments, plurality of sensors 1105 may detect the presence of driver 1115 and one or more passengers 1120 in vehicle 1100. In these embodiments, plurality of sensors 1105 may detect the presence of fastened seatbelts, the weight in each seat in vehicle 1100, heat signatures, or any other method of detecting information about driver 1115 and passengers 1120 in vehicle 1100, including those methods of determining occupants described herein.

In certain embodiments, plurality of sensors 1105 may include occupant position sensors to determine a location and/or position of each occupant (i.e., driver 1115 and passengers 1120) in vehicle 1100. The location of an occupant may identify a particular seat or other location within vehicle 1100 where the occupant is located. The position of the occupant may include the occupant's body orientation, the location of specific limbs, and/or other positional information. In one example, plurality of sensors 1105 may include an in-cabin facing camera, LIDAR, radar, weight sensors, accelerometer, gyroscope, compass and/or other types of sensors to identify the location and/or position of occupants within vehicle 1100.

Vehicle controller 1110 may interpret the sensory information to identify appropriate navigation paths, detect threats, and react to conditions. In some embodiments, vehicle controller 1110 may be able to communicate with one or more remote computer devices, such as user computing device 1125. In the example embodiment, user computing device 1125 is associated with driver 1115 and includes one or more internal sensors, such as an accelerometer, a gyroscope, and/or a compass. User computing device 125 may be capable of communicating with vehicle controller 1110 wirelessly. In addition, vehicle controller 1110 and user computing device 1125 may be configured to communicate with computer devices located remotely from vehicle 1100.

In some embodiments, vehicle 1100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 1110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Moreover, where vehicle 1100 is an autonomous or semi-autonomous vehicle, vehicle controller 1110 may interpret sensory information from sensors 1105 to determine usage of vehicle 1100 by one or more vehicle users (e.g., driver 1115 and/or passengers 1120) for each trip undertaken by vehicle 1100. Determining usage of vehicle 1100 by one or more vehicle users may facilitate monitoring, allocating, and dividing usage-based vehicle costs between the vehicle users. Usage-based vehicle costs include one or more of asset costs (e.g., in those cases in which a vehicle policy dictates allocation of asset costs according to usage, as described herein), insurance costs (e.g., in those cases in which a vehicle policy dictates allocation of insurance costs according to usage, as described herein), fuel costs (e.g., in those cases in which a vehicle policy dictates allocation of fuel costs according to usage, as described herein), maintenance costs (e.g., in those cases in which a vehicle policy dictates allocation of maintenance costs according to usage, as described herein), and incidental costs (e.g., in those cases in which a vehicle policy dictates allocation of one or more incidental costs according to usage, as described herein).

In addition, vehicle controller 1110 may interpret the sensory information to identify vehicle users (e.g., driver 1115 and/or passengers 1120) present in vehicle 1100 during a trip. For example, vehicle computer device 1110 may determine positional information for at least one vehicle user of vehicle 1100 present in vehicle 1100 during a trip. Positional information may include a position of a vehicle user, a direction of facing of the vehicle user, a size of the vehicle user, and/or a skeletal positioning of the vehicle user. The position of the vehicle user may include which seat the vehicle user occupies. The direction of facing of the vehicle user may include whether the vehicle user is facing forward, reaching forward, reaching to the side, and/or has his/her head turned. The size of the vehicle user may determine whether the vehicle user is an adult or a child. The size of the vehicle user may also include the vehicle user's height. The skeletal positioning may include positioning of the vehicle user's joints, spine, arms, legs, torso, neck face, head, major bones, hands, and/or feet.

Where vehicle 1100 is a semi-autonomous or regular vehicle, such that a driver 1115 controls vehicle 1100 during part or the entirety of one or more trips, vehicle controller 1110 may interpret sensory information to develop a driving profile for driver 1115 and/or to determine, based upon developed driving profiles, which vehicle user is a driver 1115 for a trip.

For example, vehicle controller 1110 may collect vehicle telematics data from user computing device 1125 and/or one or more of sensors 1105. Vehicle telematics data may include data from user computing device 1125 and/or one or more of sensors 1105 and may include navigation, communications, safety, security, and/or "infotainment" data. For example, vehicle telematics data collected and analyzed by vehicle controller 1110 may include, but is not limited to braking and/or acceleration data, navigation data, vehicle settings (e.g., seat position, mirror position, temperature or air control settings, etc.), remote-unlock and/or remote-start data (e.g., determining which user computing device 1125 is used to unlock or start vehicle 1100) and/or any other telematics data.

In some embodiments, collecting and monitoring vehicle telematics data may enable developing a profile or status of vehicle 1100 and/or driver(s) 1115 thereof, during autonomous, semi-autonomous, and/or user-driven trips. For example, vehicle controller 1110 may develop a vehicle or autonomous profile that characterizes the driving of vehicle-driven trips by vehicle 1100 based upon vehicle telematics data collected during known vehicle-driven or autonomous trips. Vehicle controller 1110 may additionally develop driver profiles for each vehicle user that acts as a driver 1115 of vehicle 1100. Vehicle controller 1110 may compare collected telematics data to one or more developed driver profiles to determine driver 1115 for a trip. Accordingly, one or more usage-based costs that are calculated and/or allocated based upon an identity of driver 1115 may be calculated and/or allocated properly. Specifically, vehicle controller 1110 may use collected vehicle telematics data to more accurately determine usage-based insurance cost allocation by more accurately identifying drivers 1115 of vehicle 1100 and/or tracking a level of risk of any one driver 1115 during a trip. For example, a driver 1115 may have a particularly low insurance rate but may exhibit one or more high-risk behaviors, according to collected vehicle telematics data (e.g., high occurrence of abrupt deceleration, particularly fast turns, and/or extreme acceleration). Accordingly, vehicle controller 1110 may use collected vehicle telematics data to adjust an insurance rate associated with driver 1115 and/or allocate a higher percentage of an insurance cost to driver 1115. Moreover, in an event of an accident or vehicular crash, vehicle controller 1110 may facilitate determining driver 1115 to assist in determining allocation of incidental costs associated with the accident. Additionally or alternatively, vehicle controller 1110 may use collected vehicle telematics data to determine a status of vehicle 1100 before and after the accident to assist in determining repair costs and/or generating an insurance claim.

In one aspect of the present disclosure, a vehicle cost allocation (VCA) computing device (e.g., vehicle controller 1110) for allocating vehicle costs between users of a vehicle may be provided. The VCA computing device may include a memory and a processor, wherein the processor is programmed to receive vehicle telematics data from one or more sensors within the vehicle, and, based upon the received vehicle telematics data, identify one or more vehicle users present in the vehicle during a trip. The processor may be further programmed to determine a vehicle cost associated with the trip, and allocate a respective portion of the vehicle cost to each of the one or more vehicle users.

In another aspect, a computer-implemented method for allocating vehicle costs between users of a vehicle may be provided. The method may be implemented using a vehicle cost allocation (VCA) computing device (e.g., vehicle controller 1110) including a processor and a memory. The method may include receiving vehicle telematics data from one or more sensors within the vehicle, and based upon the received vehicle telematics data, identifying one or more vehicle users present in the vehicle during a trip. The method may also include determining a vehicle cost associated with the trip, and allocating a respective portion of the vehicle cost to each of the one or more vehicle users.

While vehicle 1100 may be an automobile in the exemplary embodiment, in other embodiments, vehicle 1100 may be, but is not limited to, other types of ground craft, aircraft, and watercraft vehicles.

Exemplary Insurance-Related Functionality

In another aspect, a computer-implemented method of allocating vehicle costs between users of a vehicle, the vehicle costs including an insurance cost, may be provided. The method may include (i) receiving a trip report associated with a trip performed using a vehicle, the trip associated with one or more vehicle users of a plurality of vehicle users of the vehicle; (ii) determining which vehicle user of the one or more vehicle users is a driver for the trip; (iii) retrieving insurance policy information associated with the driver; (iv) retrieving one or more vehicle policies provided by the plurality of vehicle users; (v) determining an insurance cost associated with the trip based at least in part upon the insurance policy information and the one or more vehicle policies; and/or (vi) allocating the insurance cost between the one or more vehicle users. The method may include additional, less, or alternate functionality, including that discussed elsewhere herein.

Additionally or alternatively, the method may include determining one or more other vehicle costs associated with the trip, such as fuel costs and/or maintenance costs. The method may also include allocating the one or more other vehicle costs based at least in part upon the one or more vehicle policies. Additionally or alternatively, the method may include allocating a first portion of the one or more vehicle costs to the driver, and/or allocating a second portion, the second portion greater that the first portion, of the one or more other vehicle costs to each other vehicle user of the one or more vehicle users. For instance, if the driver for the trip has a lower associated insurance rate and therefore is chosen and/or requested to drive for the trip, the driver may be allocated a lower portion of, for example, fuel costs than their passengers, to compensate for the lower insurance rate incurred and/or the effort of driving. Additionally or alternatively, the method may include allocating equal portions of the insurance costs between all vehicle users associated with the trip, wherein the insurance cost for the trip is determined based upon which vehicle user is the driver for the trip.

In a further aspect, a computer-implemented method of allocating vehicle costs between users of a vehicle may be provided. The method may include (i) receiving a potential trip report associated with a potential future trip to be performed using a vehicle, the potential trip report associated with at least one vehicle user including an anticipated driver of the vehicle and an anticipated passenger, the potential trip report including an anticipated destination; (ii) retrieving insurance policy information associated with at least one of the vehicle and the anticipated driver of the vehicle; (iii) generating an anticipated insurance cost based upon the anticipated driver of the vehicle and the anticipated destination; (iv) allocating the anticipated insurance cost between the anticipated driver and the anticipated passenger; and/or transmitting the anticipated insurance cost to one or more computing devices for review by the anticipated driver.

Additionally or alternatively, the method may include determining a current location of the vehicle using at least one GPS sensor, determining an anticipated route associated with the potential trip based upon the current location of the vehicle and the anticipated destination, and/or calculating at least one of an anticipated number of miles driven and anticipated amount of time driven for the anticipated route, to generate the anticipated insurance cost based upon the at least one of an anticipated number of miles driven and anticipated amount of time driven. The method may include retrieving a current fuel cost associated with at least one of the current location of the vehicle and the anticipated route, calculating an anticipated fuel cost associated with the trip based upon the current fuel cost and the anticipated number of miles driven, and/or transmitting the anticipated fuel cost to one or more computing devices for review by the anticipated driver. The method may also include identifying one or more incidental costs associated with the anticipated trip, and/or transmitting the one or more anticipated incidental costs to one or more computing devices for review by the anticipated driver. The method may further include, in some embodiments, receiving an affirmative response indicating the potential trip is to be taken, and/or transmitting a hold instruction to a respective financial account of the anticipated driver and the anticipated passenger to hold funds in an amount of the allocated insurance cost.

In yet another aspect, a computer-implemented method of allocating vehicle costs between users of a vehicle may be provided. The method may include (i) receiving a trip report associated with a trip performed using a vehicle, the trip report associated with a plurality of vehicle users of the vehicle and including an identification of a distance of the trip; (ii) determining which vehicle user of the plurality of vehicle users is a driver of the trip; (iii) retrieving insurance policy information associated with the driver of the trip; (iv) calculating an insurance cost associated with the trip based at least in part upon the insurance policy information and the distance of the trip; and/or (v) allocating the insurance cost between the plurality of vehicle users.

Additionally or alternatively, the method may include identifying a mileage rate in the insurance policy information, the mileage rate describing an insurance rate incurred for each mile driven. In other embodiments, the method may include identifying a mileage rate in the insurance policy information, the mileage rate describing a first insurance rate incurred for each mile driven below a threshold mileage value and a second insurance rate incurred for each mile drive above the threshold mileage value, the second insurance rate higher than the first insurance rate.

Exemplary Embodiments and Methods

The present embodiments may additionally provide automated payment management of the respective user portions of the total vehicle cost. In these embodiments, VCA computing device 102 may not only determine what each vehicle user is obligated to pay but may manage withdrawal and/or transfer of the appropriate funds to each payee party. Such payment management may save the vehicle users time and effort and may ensure more accurate and timely payment to each payee party.

In one aspect, a computer-implemented method managing payment of vehicle costs for users of a shared vehicle is provided. The method may include (1) determining a respective portion of a total vehicle cost to be allocated to each vehicle user of a plurality of vehicle users associated with a vehicle, the total vehicle cost associated the vehicle over a predetermined interval of time; (2) accessing a respective pre-paid account associated with each vehicle user; and/or (3) transmitting instructions to a respective financial institution associated with each pre-paid account to withdraw funds corresponding to the respective portion of the total vehicle cost. The method may include additional, less, or alternate functionality, including that discussed elsewhere herein.

For instance, the method may include dividing each respective portion of the total vehicle cost into a plurality of payments, each payment of the plurality of payments associated with a different payee. The method may further include transmitting instructions to the respective financial institution associated with each pre-paid account to transfer funds corresponding to each respective payment of the plurality of payments to a payment account of the corresponding payee.

Additionally or alternatively, the method may include identifying a first segment of the total vehicle cost, the first segment independent of the respective portions and equally associated with the plurality of vehicle users. For example, the first segment may represent a maintenance cost that is divided equally among the vehicle users regardless of usage. The method may further include accessing a joint pre-paid account associated with the plurality of vehicle users. The method may also include transmitting instructions to a financial institution associated with the joint pre-paid account to withdraw funds corresponding to the first segment of the total vehicle cost.

Additional Embodiments

In one aspect, a computer-implemented method for allocating vehicle costs between users of a vehicle may be provided. The vehicle costs may include an insurance cost. The method may be implemented using a vehicle cost allocation (VCA) computing device including a processor and a memory. The method may include (1) receiving, via one or more processors and/or transceivers, a trip report and/or sensor data associated with a trip performed using a vehicle (either pre-trip or post-trip), the trip associated with one or more vehicle users of multiple vehicle users of the vehicle (such as via wireless communication or data transmission over one or more radio links or wireless communication channels, the trip report and sensor data being transmitted by a vehicle controller or a user mobile device); (2) determining, via the one or more processors, which vehicle user of the one or more vehicle users is a driver for the trip based upon the sensor data received; (3) retrieving, via the one or more processors, insurance policy information and/or a risk profile associated with the driver from a memory unit; (4) determining, via the one or more processors, a usage-based insurance cost (such as mileage or time based insurance premium or cost, or a pay-by-mile insurance premium) associated with the trip based at least in part upon (i) the insurance policy information and/or risk profile associated with the driver, and/or (ii) the trip report; and/or (5) transmitting, via the one or more processors and/or transceivers, the usage-based insurance cost to the driver's mobile device or vehicle controller via wireless communication or data transmission over one or more radio links or wireless communication channels for the driver's review and/or approval (either before or after the trip) to facilitate allocating the insurance cost between the one or more vehicle users.

In another aspect, a computer-implemented method for allocating vehicle costs between users of a vehicle may be provided. The method may be implemented using a vehicle cost allocation (VCA) computing device including a processor and a memory. The method may include (1) receiving, via one or more processors and/or transceivers (such as via wireless communication or data transmission over one or more radio links or wireless communication channels), (i) vehicle data identifying a vehicle, (ii) a proposed trip report, and/or (iii) sensor data associated with a driver of the vehicle (from a driver mobile device or a vehicle-mounted controller/computer) before a trip is taken using a vehicle, the vehicle having multiple vehicle users of the vehicle (the trip report and sensor data being transmitted by a vehicle controller or a user mobile device); (2) determining, via the one or more processors, an identity of the driver from among the multiple users of the vehicle for the trip based upon the sensor data received; (3) retrieving, via the one or more processors, insurance policy information and/or a risk profile associated with the driver identified from a memory unit; (4) determining, via the one or more processors, a usage-based insurance cost associated with the trip based at least in part upon the insurance policy information and/or risk profile associated with the driver identified, and/or a usage-based insurance cost adjustment based upon the proposed trip report; and/or (5) transmitting, via the one or more processors and/or transceivers, the usage-based insurance cost and/or cost adjustment associated with the proposed trip to the driver's mobile device or vehicle controller via wireless communication or data transmission over one or more radio links or wireless communication channels for the driver's review and/or approval prior to the trip to facilitate allocating the insurance cost between the one or more vehicle users.

In another aspect, a computer-implemented method for allocating vehicle costs between users of a vehicle may be provided. The method may be implemented using a vehicle cost allocation (VCA) computing device including a processor and a memory. The method may include (1) receiving, via one or more processors and/or transceivers (such as via wireless communication or data transmission over one or more radio links or wireless communication channels), (i) vehicle data identifying a vehicle, (ii) a trip report, and/or (ii) sensor data associated with a driver of the vehicle (from a driver mobile device or a vehicle-mounted controller/computer) after a trip is taken using a vehicle, the vehicle having multiple vehicle users of the vehicle (the vehicle data, the trip report, and sensor data being transmitted by a vehicle controller or a user mobile device); (2) determining, via the one or more processors, an identity of the driver from among the multiple users of the vehicle for the trip based upon the sensor data or trip report received; (3) retrieving, via the one or more processors, insurance policy information and/or a risk profile associated with the driver identified from a memory unit; (4) determining, via the one or more processors, a usage-based insurance cost associated with the trip based at least in part upon the insurance policy information and/or risk profile associated with the driver identified or a usage-based insurance cost adjustment for the driver based upon the trip report; and/or (5) transmitting, via the one or more processors and/or transceivers, the usage-based insurance cost or cost adjustment for the trip to the driver's mobile device or vehicle controller via wireless communication or data transmission over one or more radio links or wireless communication channels for the driver's review and/or approval after the trip to facilitate allocating the insurance cost between the one or more vehicle users.

The foregoing methods may include additional, less, or alternate functionality, including that discussed elsewhere herein. The foregoing methods may be implemented via one or more local or remote processors, sensors, transceivers, and/or servers, and/or via computer-executable instructions stored on non-transitory computer-readable media or medium.

In another aspect, a computer system configured to allocate vehicle costs between users of a vehicle may be provided. The computer system comprising one or more local or remote processors, servers, transceivers, and/or sensors configured to: (1) receive a trip report and sensor data associated with a trip performed using a vehicle (either pre-trip or post-trip), the trip associated with one or more vehicle users of multiple vehicle users of the vehicle (such as via wireless communication or data transmission over one or more radio links or wireless communication channels, the trip report and sensor data being transmitted by a vehicle controller or a user mobile device); (2) determine which vehicle user of the one or more vehicle users is a driver for the trip based upon the sensor data or trip report received; (3) retrieve insurance policy information and/or a risk profile associated with the driver from a memory unit; (4) determine a usage-based insurance cost associated with the trip based at least in part upon (i) the insurance policy information and/or risk profile associated with the driver, and/or (ii) the trip report; and/or (5) transmit the usage-based insurance cost to the driver's mobile device or vehicle controller via wireless communication or data transmission over one or more radio links or wireless communication channels for the driver's review and/or approval (either before or after the trip) to facilitate allocating the insurance cost between the one or more vehicle users.

In another aspect, a computer system configured to allocate vehicle costs between users of a vehicle may be provided. The computer system comprising one or more local or remote processors, transceivers, sensors, and/or servers configured to: (1) receive, via wireless communication or data transmission over one or more radio links or wireless communication channels, (i) vehicle data identifying a vehicle, (ii) a proposed trip report, and/or (iii) sensor data associated with a driver of the vehicle (from a driver mobile device or a vehicle-mounted controller/computer) before a trip is taken using a vehicle, the vehicle having multiple vehicle users of the vehicle (the vehicle data, the trip report, and sensor data being transmitted by a vehicle controller or a user mobile device); (2) determine an identify of the driver from among the multiple users of the vehicle for the trip based upon the sensor data and/or proposed trip report received; (3) retrieve insurance policy information and/or a risk profile associated with the driver identified from a memory unit; (4) determine a usage-based insurance cost associated with the trip based at least in part upon (i) the insurance policy information and/or risk profile associated with the driver identified, and/or (ii) proposed trip report, and/or determine a usage-based insurance cost adjustment based upon the proposed trip report; and/or (5) transmit the usage-based insurance cost and/or cost adjustment associated with the proposed trip to the driver's mobile device or vehicle controller via wireless communication or data transmission over one or more radio links or wireless communication channels for the driver's review and/or approval prior to the trip to facilitate allocating the insurance cost between the one or more vehicle users.

In another aspect, a computer system configured to allocate vehicle costs between users of a vehicle may be provided. The computer system comprising one or more local or remote processors, transceivers, sensors, and/or sensors configured to: (1) receive, via wireless communication or data transmission over one or more radio links or wireless communication channels, (i) vehicle data identifying a vehicle, (ii) a trip report, and/or (iii) sensor data associated with a driver of the vehicle (from a driver mobile device or a vehicle-mounted controller/computer) after a trip is taken using a vehicle, the vehicle having multiple vehicle users of the vehicle (the vehicle data, the trip report, and sensor data being transmitted by a vehicle controller or a user mobile device); (2) determine an identify of the driver from among the multiple users of the vehicle for the trip based upon the sensor data and/or trip report received; (3) retrieve insurance policy information and/or a risk profile associated with the driver identified and/or vehicle from a memory unit; (4) determine a usage-based insurance cost associated with the trip based at least in part upon (i) the insurance policy information and/or risk profile associated with the driver identified, and/or (ii) trip report, and/or determine a usage-based insurance cost adjustment for the driver based upon the trip report and/or risk profile for the driver; and/or (5) transmit the usage-based insurance cost or cost adjustment for the trip to the driver's mobile device or vehicle controller via wireless communication or data transmission over one or more radio links or wireless communication channels for the driver's review and/or approval after the trip to facilitate allocating the insurance cost between the one or more vehicle users and/or readjusting insurance costs post-trip.

The foregoing computer systems may include additional, less, or alternate functionality, including that discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or objectoriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A vehicle cost allocation (VCA) computing device for allocating vehicle costs between users of a vehicle, the VCA computing device comprising a memory and a processor, wherein the processor is programmed to:

receive, from one or more computing devices associated with at least one vehicle user of the vehicle, an anticipated trip report associated with a future trip to be performed using the vehicle, the anticipated trip report associated with the at least one vehicle user, the at least one vehicle user being one of a driver of the vehicle and a passenger of the vehicle, the anticipated trip report including an anticipated destination and an identification of a first user-specific key capable of accessing the vehicle, the first user-specific key associated with a first vehicle user of the at least one vehicle user;

parse the anticipated trip report to identify the first user-specific key;

receive, from one or more sensors associated with the vehicle, the first user-specific key and a second user-specific key associated with a second vehicle user of the at least one vehicle user, the first user-specific key and the second user-specific key indicating that the first vehicle user and the second vehicle user have initiated the future trip, the first user-specific key and the second user-specific key provided and registered, during a registration process with the VCA computing device, to the first vehicle user and the second vehicle user respectively, the first user-specific key and second user-specific key each being one of a key fob and an electronic key included in a computing device;

identify the first vehicle user as the driver of the future trip by determining that the first user-specific key is associated with the driver of the vehicle;

receive, from the one or more sensors, global position system (GPS) coordinates of a current location of the vehicle;

in response to receiving the anticipated destination and the GPS coordinates, determine a distance of the future trip based upon the anticipated destination and the GPS coordinates;

retrieve, from the memory, a first usage report associated with the first vehicle user and a second usage report associated with the second vehicle user, each usage report generated using information previously collected by the one or more sensors during one or more previous trips performed by each of the first vehicle user and the second vehicle user using the vehicle, each usage report indicating at least one of a cumulative amount, a frequency, and a type of usage of the vehicle i) by each of the first vehicle user and the second vehicle user and ii) associated with the one or more previous trips, wherein a previous driver of the one or more previous trips is one of the first vehicle user and the second vehicle user, and wherein a previous passenger of the one or more previous trips is one of the first vehicle user and the second vehicle user;

retrieve, from the memory, insurance policy information associated with the vehicle, the first vehicle user, and the second vehicle user, wherein the insurance policy information includes at least one pre-defined vehicle policy identifying how the vehicle cost is to be allocated between the first vehicle user and the second vehicle user, wherein the at least one pre-defined vehicle policy was agreed to by the first vehicle user and the second vehicle user and stored in the memory during the registration process;

generate an anticipated insurance cost based upon the first usage report, the second usage report, the first vehicle user being the driver of the future trip, the at least one pre-defined vehicle policy, the anticipated destination, and the distance of the future trip;

allocate the anticipated insurance cost between the first vehicle user and the second vehicle user; and transmit the anticipated insurance cost to the one or more computing devices for review by the driver.

2. The VCA computing device of claim 1, wherein the processor is further programmed to:

determine a current location of the vehicle using at least one GPS sensor associated with the one or more computing devices;

determine an anticipated route associated with the future trip based upon at least one of the current location of the vehicle, the anticipated destination, and the distance of the future trip;

in response to determining the anticipated route, calculate at least one of an anticipated number of miles driven and an anticipated amount of time driven for the anticipated route; and generate the anticipated insurance cost based upon at least one of the anticipated number of miles driven and the anticipated amount of time driven.

3. The VCA computing device of claim 2, wherein the processor is further programmed to:

retrieve a current fuel cost associated with at least one of the current location of the vehicle and the anticipated route;

calculate an anticipated fuel cost associated with the future trip based upon the current fuel cost and the anticipated number of miles driven; and transmit the anticipated fuel cost to the one or more computing devices for review by the driver.

4. The VCA computing device of claim 2, wherein the processor is further programmed to:

identify one or more incidental costs associated with the future trip; and transmit the one or more incidental costs to the one or more computing devices for review by the driver.

5. The VCA computing device of claim 1, wherein the processor is further configured to:

receive the anticipated trip report from a vehicle computing device of the one or more computing devices associated with the at least one vehicle user, the vehicle computing device integral to the vehicle; and transmit the anticipated insurance cost to the vehicle computing device.

6. The VCA computing device of claim 1, wherein the processor is further configured to:

receive the anticipated trip report from a user computing device of the one or more computing devices associated with the at least one vehicle user, the user computing device associated with the driver; and transmit the anticipated insurance cost to the user computing device.

7. The VCA computing device of claim 1, wherein the processor is further configured to:

receive an affirmative response indicating the future trip is to be taken; and transmit a hold instruction to a respective financial account of the first vehicle user and the second vehicle user to hold funds in an amount of each allocated anticipated insurance cost.

8. The VCA computing device of claim 1, wherein the processor is further configured to:

generate, receive, or retrieve vehicle telematics data associated with the vehicle.

9. The VCA computing device of claim 8, wherein the processor is further configured to:

generate the anticipated insurance cost based upon, at least in part, the vehicle telematics data.

10. The VCA computing device of claim 1, wherein the processor is further programmed to:

determine that the first user-specific key is associated with the driver of the vehicle by identifying that the first user-specific key is at least one of paired with the vehicle and used to start the vehicle.

11. A computer-implemented method for allocating vehicle cost between users of a vehicle, the method implemented using a vehicle cost allocation (VCA) computing device including a processor in communication with a memory, the method comprising, via one or more processors, sensors, servers, or transceivers:

receiving, from one or more computing devices associated with at least one vehicle user of the vehicle, an anticipated trip report associated with a future trip to be performed using the vehicle, the anticipated trip report associated with the at least one vehicle user, the at least one vehicle user being one of a driver of the vehicle and a passenger of the vehicle, the anticipated trip report including an anticipated destination and an identification of a first user-specific key capable of accessing the vehicle, the first user-specific key associated with a first vehicle user of the at least one vehicle user;

parsing the anticipated trip report to identify the first user-specific key;

receiving, from one or more sensors associated with the vehicle, the first user-specific key and a second user-specific key associated with a second vehicle user of the at least one vehicle user, the first user-specific key and the second user-specific key indicating that the first vehicle user and the second vehicle user have initiated the future trip, the first user-specific key and the second user-specific key provided and registered, during a registration process with the VCA computing device, to the first vehicle user and the second vehicle user respectively, the first user-specific key and second user-specific key each being one of a key fob and an electronic key included in a computing device;

identifying the first vehicle user as the driver of the future trip by determining that the first user-specific key is associated with the driver of the vehicle;

receiving, from the one or more sensors, global position system (GPS) coordinates of a current location of the vehicle;

in response to receiving the anticipated destination and the GPS coordinates, determining a distance of the future trip based upon the anticipated destination and the GPS coordinates;

retrieving, from the memory, first usage report associated with the first vehicle user and a second usage report associated with the second vehicle user, each usage report generated using information previously collected by the one or more sensors during one or more previous trips performed by each of the first vehicle user and the second vehicle user using the vehicle, each usage report indicating at least one of a cumulative amount, a frequency, and a type of usage of the vehicle i) by each of the first vehicle user and the second vehicle user and ii) associated with the one or more previous trips, wherein a previous driver of the one or more previous trips is one of the first vehicle user and the second vehicle user, and wherein a previous passenger of the one or more previous trips is one of the first vehicle user and the second vehicle user;

retrieving, from the memory, insurance policy information associated with the vehicle, the first vehicle user, and the second vehicle user, wherein the insurance policy information includes at least one pre-defined vehicle policy identifying how the vehicle cost is to be allocated between the first vehicle user and the second vehicle user, wherein the at least one pre-defined vehicle policy was agreed to by the first vehicle user and the second vehicle user and stored in the memory during the registration process;

generating an anticipated insurance cost based upon the first usage report, the second usage report, the first vehicle user being the driver of the future trip, the at least one pre-defined vehicle policy, the anticipated destination, and the distance of the future trip;

allocating the anticipated insurance cost between the first vehicle user and the second vehicle user; and transmitting the anticipated insurance cost to the one or more computing devices for review by the driver.

12. The computer-implemented method of claim 11 further comprising:

determining a current location of the vehicle using at least one GPS sensor associated with the one or more computing devices;

determining an anticipated route associated with the future trip based upon at least one of the current location of the vehicle, the anticipated destination, and the distance of the future trip;

in response to determining the anticipated route, calculating at least one of an anticipated number of miles driven and an anticipated amount of time driven for the anticipated route; and generating the anticipated insurance cost based upon at least one of the anticipated number of miles driven and the anticipated amount of time driven.

13. The computer-implemented method of claim 12 further comprising:

retrieving a current fuel cost associated with at least one of the current location of the vehicle and the anticipated route;

calculating an anticipated fuel cost associated with the future trip based upon the current fuel cost and the anticipated number of miles driven; and transmitting the anticipated fuel cost to the one or more computing devices for review by the driver.

14. The computer-implemented method of claim 12 further comprising:

identifying one or more incidental costs associated with the future trip; and transmitting the one or more incidental costs to the one or more computing devices for review by the driver.

15. The computer-implemented method of claim 11, wherein receiving the anticipated trip report comprises receiving the anticipated trip report from a vehicle computing device of the one or more computing devices associated with the at least one vehicle user, the vehicle computing device integral to the vehicle, and wherein transmitting the anticipated insurance cost further comprises transmitting the anticipated insurance cost to the vehicle computing device.

16. The computer-implemented method of claim 11, wherein receiving the anticipated trip report further comprises receiving the anticipated trip report from a user computing device of the one or more computing devices associated with the at least one vehicle user, the user computing device associated with the driver, and wherein transmitting the anticipated insurance cost further comprises transmitting the anticipated insurance cost to the user computing device.

17. The computer-implemented method of claim 11 further comprising:

receiving an affirmative response indicating the future trip is to be taken; and transmitting a hold instruction to a respective financial account of the first vehicle user and the second vehicle user to hold funds in an amount of each allocated anticipated insurance cost.

18. A vehicle cost allocation (VCA) computing device for allocating vehicle costs between users of a vehicle, the VCA computing device comprising a memory and a processor, wherein the processor is programmed to:

receive, from one or more computing devices associated with a plurality of vehicle users of the vehicle, a trip report associated with a trip performed using the vehicle, the trip report associated with the plurality of vehicle users and including an anticipated destination and an identification of a first user-specific key capable of accessing the vehicle, the first user-specific key associated with a first vehicle user of the plurality of vehicle users;

parse the trip report to identify the first user-specific key;

receive, from one or more sensors associated with the vehicle, a plurality of user-specific keys associated with the plurality of vehicle users, the plurality of user-specific keys including the first user-specific key, the plurality of user-specific keys indicating that at least two vehicle users of the plurality of vehicle users are performing the trip, the plurality of user-specific keys provided and registered, during a registration process with the VCA computing device, to each of the plurality of vehicle users, each of the plurality of user-specific keys being one of a key fob and an electronic key included in a computing device;

identify the first vehicle user as a driver of the trip by determining that the first user-specific key is associated with the driver of the vehicle;

receive, from the one or more sensors, global position system (GPS) coordinates of a current location of the vehicle;

in response to receiving the anticipated destination and the GPS coordinates, determine a distance of the trip based upon the anticipated destination and the GPS coordinates;

retrieve, from the memory, a usage report associated with the first vehicle user, the usage report generated using information previously collected by the one or more sensors during one or more previous trips performed by the first vehicle user using the vehicle, the usage report indicating at least one of a cumulative amount, a frequency, and a type of usage of the vehicle by i) the first vehicle user and ii) associated with the one or more previous trips, wherein the first vehicle user is one of a previous driver and a previous passenger in each of the one or more previous trips;
retrieve, from the memory, insurance policy information associated with the first vehicle user, wherein the insurance policy information includes at least one pre-defined vehicle policy identifying how the vehicle cost is to be allocated between the plurality of vehicle users, wherein the at least one pre-defined vehicle policy was agreed to by the plurality of vehicle users and stored in the memory during the registration process;
calculate an insurance cost associated with the trip based at least in part upon the usage report, the at least one pre-defined vehicle policy, and the distance of the trip; and
allocate the insurance cost between the plurality of vehicle users.

19. The VCA computing device of claim 18, wherein the processor is further programmed to:
receive the trip report from a user computing device of the one or more computing devices, the user computing device associated with the driver; and
transmit an indication of the insurance cost to the user computing device for review by the driver.

20. The VCA computing device of claim 18, wherein the processor is further programmed to:
receive the trip report from a vehicle computing device of the one or more computing devices, the vehicle computing device integral to the vehicle; and
transmit an indication of the insurance cost to the vehicle computing device for review by at least one of the plurality of vehicle users.

21. The VCA computing device of claim 18, wherein the processor is further programmed to identify a mileage rate in the insurance policy information, the mileage rate describing an insurance rate incurred for each mile driven.

22. The VCA computing device of claim 18, wherein the processor is further programmed to identify a mileage rate in the insurance policy information, the mileage rate describing a first insurance rate incurred for each mile driven below a threshold mileage value and a second insurance rate incurred for each mile driven above the threshold mileage value, the second insurance rate higher than the first insurance rate.

* * * * *